INVENTOR
ATTILIO ERRERA
By Emil Bönnelycke
ATTORNEY

Aug. 29, 1939.  A. ERRERA  2,171,492

COIN COLLECTING AND OBJECT DISTRIBUTING MACHINE

Filed Feb. 4, 1936  17 Sheets-Sheet 3

INVENTOR
ATTILIO ERRERA
By Emil Bönnelycke
ATTORNEY

Aug. 29, 1939.　　　　A. ERRERA　　　　2,171,492
COIN COLLECTING AND OBJECT DISTRIBUTING MACHINE
Filed Feb. 4, 1936　　　17 Sheets-Sheet 4
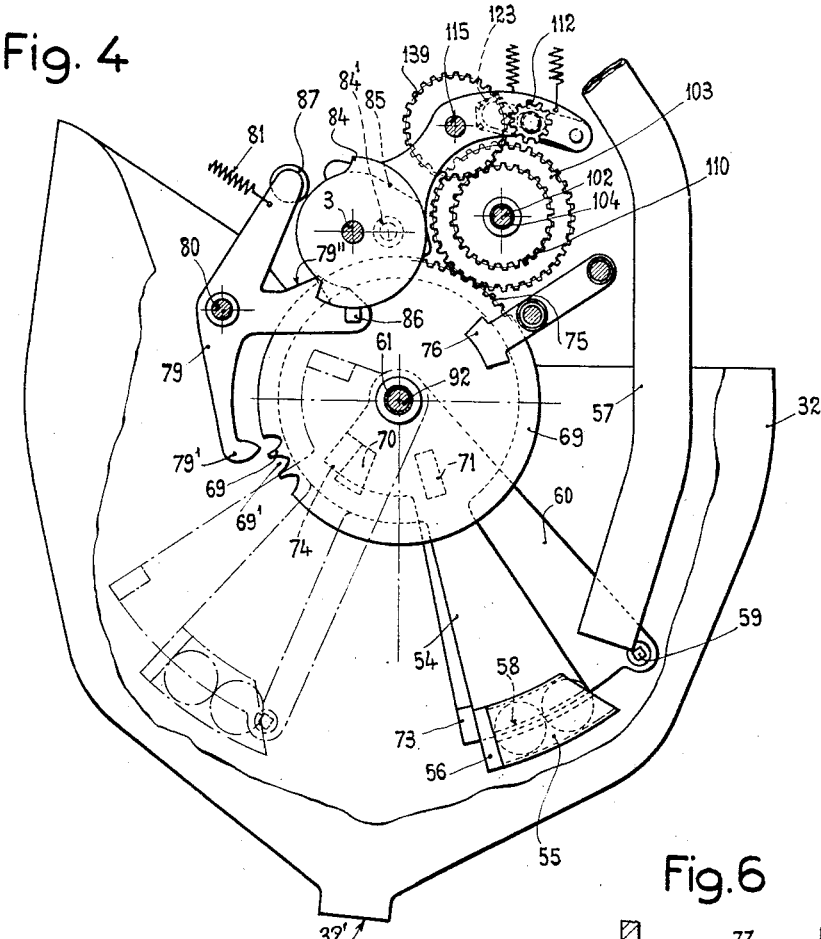
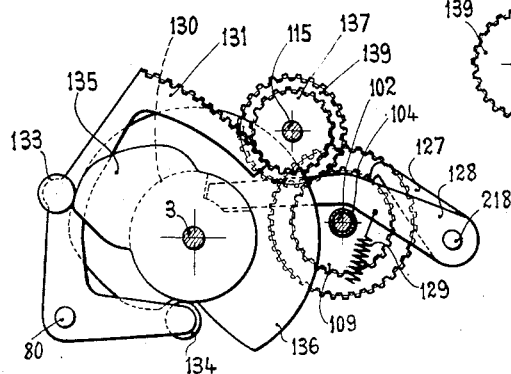
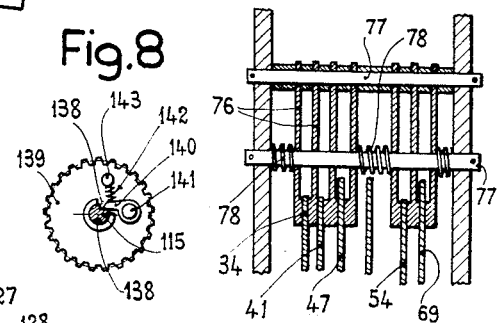
INVENTOR
ATTILIO ERRERA
By Emil Bönnelycke
ATTORNEY Aug. 29, 1939.  A. ERRERA  2,171,492
COIN COLLECTING AND OBJECT DISTRIBUTING MACHINE
Filed Feb. 4, 1936    17 Sheets-Sheet 5
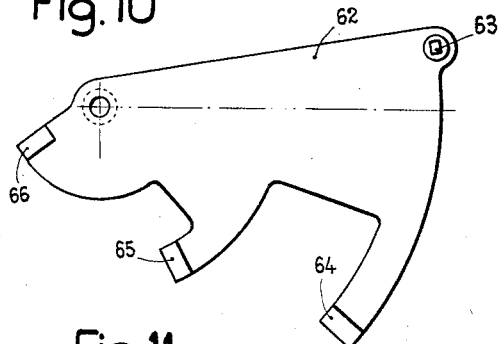
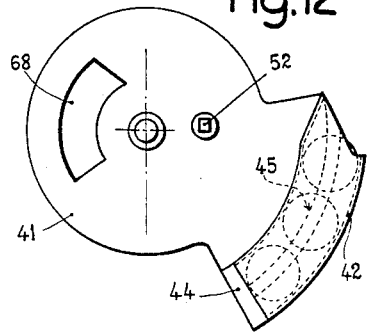
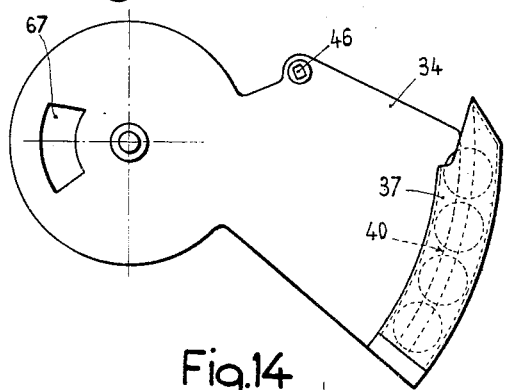
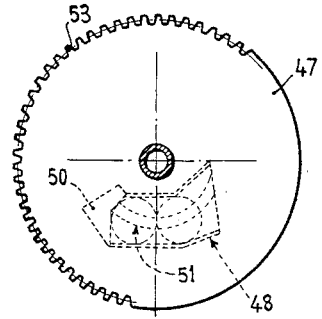
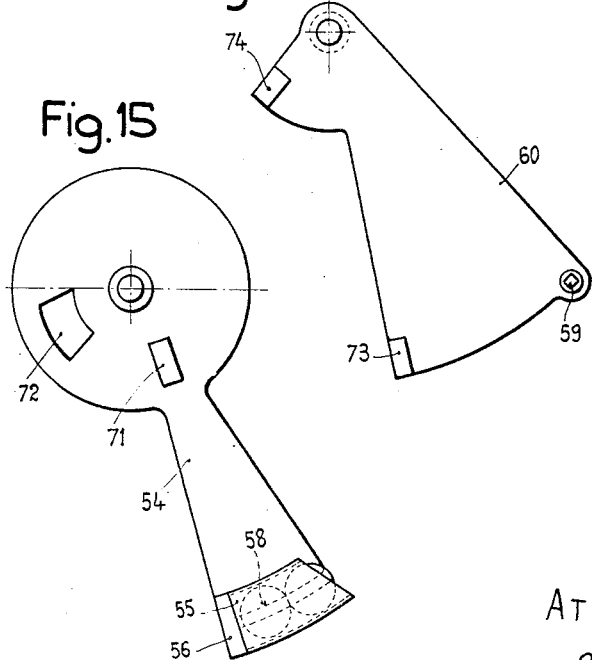
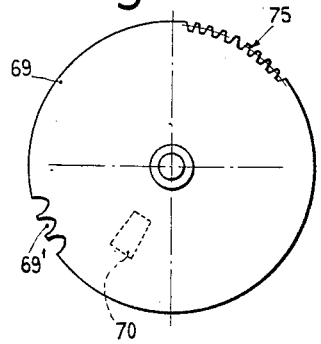
INVENTOR
ATTILIO ERRERA
By Emil Bönnelycke
ATTORNEY Aug. 29, 1939.  A. ERRERA  2,171,492
COIN COLLECTING AND OBJECT DISTRIBUTING MACHINE
Filed Feb. 4, 1936  17 Sheets-Sheet 6
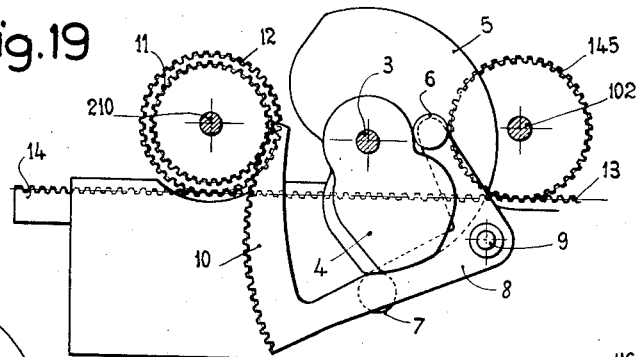
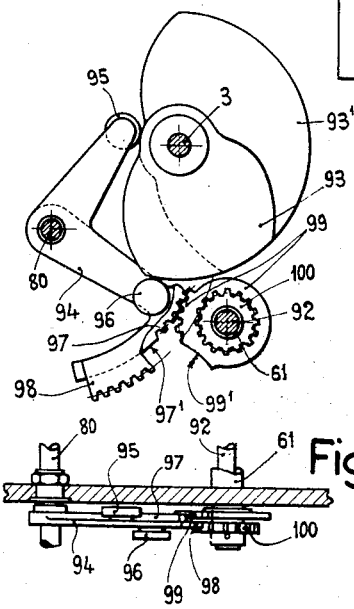
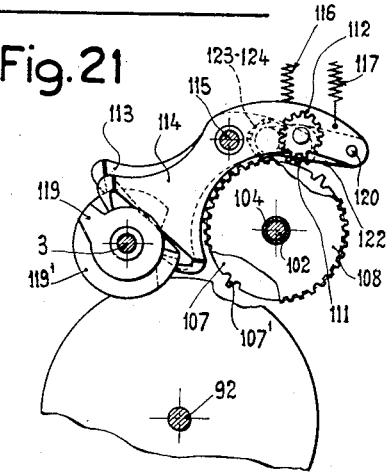
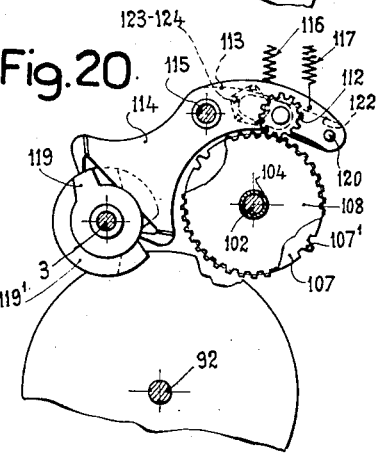
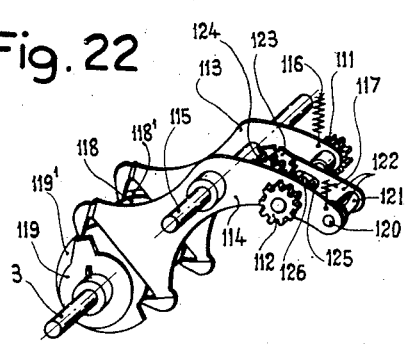
INVENTOR
ATTILIO ERRERA
By Emil Bönnelycke
ATTORNEY Aug. 29, 1939.  A. ERRERA  2,171,492
COIN COLLECTING AND OBJECT DISTRIBUTING MACHINE
Filed Feb. 4, 1936   17 Sheets-Sheet 7

INVENTOR
ATTILIO ERRERA
By Emil Bönnelycke
ATTORNEY

Aug. 29, 1939.  A. ERRERA  2,171,492
COIN COLLECTING AND OBJECT DISTRIBUTING MACHINE
Filed Feb. 4, 1936   17 Sheets-Sheet 8

INVENTOR
ATTILIO ERRERA
By Emil Bönnelycke
ATTORNEY

Aug. 29, 1939.　　　A. ERRERA　　　2,171,492
COIN COLLECTING AND OBJECT DISTRIBUTING MACHINE
Filed Feb. 4, 1936　　17 Sheets-Sheet 9

INVENTOR
ATTILIO ERRERA
By Emil Bönnehycke
ATTORNEY

Aug. 29, 1939. A. ERRERA 2,171,492
COIN COLLECTING AND OBJECT DISTRIBUTING MACHINE
Filed Feb. 4, 1936   17 Sheets-Sheet 10

INVENTOR
ATTILIO ERRERA
By Emil Bönnelycke
ATTORNEY

Aug. 29, 1939.  A. ERRERA  2,171,492
COIN COLLECTING AND OBJECT DISTRIBUTING MACHINE
Filed Feb. 4, 1936  17 Sheets-Sheet 11

INVENTOR
ATTILIO ERRERA
By Emil Bönnelycke
ATTORNEY

Aug. 29, 1939.  A. ERRERA  2,171,492
COIN COLLECTING AND OBJECT DISTRIBUTING MACHINE
Filed Feb. 4, 1936  17 Sheets-Sheet 12

INVENTOR
ATTILIO ERRERA
By Emil Bönnelycke
ATTORNEY

Aug. 29, 1939.                    A. ERRERA                    2,171,492
                COIN COLLECTING AND OBJECT DISTRIBUTING MACHINE
                    Filed Feb. 4, 1936        17 Sheets-Sheet 14

INVENTOR
ATTILIO ERRERA
By Emil Bönneljeke
ATTORNEY

Aug. 29, 1939.   A. ERRERA   2,171,492
COIN COLLECTING AND OBJECT DISTRIBUTING MACHINE
Filed Feb. 4, 1936   17 Sheets-Sheet 15

INVENTOR
ATTILIO ERRERA
By Emil Bönnelycke
ATTORNEY

Aug. 29, 1939.  A. ERRERA  2,171,492
COIN COLLECTING AND OBJECT DISTRIBUTING MACHINE
Filed Feb. 4, 1936   17 Sheets-Sheet 16

INVENTOR
ATTILIO ERRERA
By Emil Bönnelycke
ATTORNEY

Aug. 29, 1939.  A. ERRERA  2,171,492

COIN COLLECTING AND OBJECT DISTRIBUTING MACHINE

Filed Feb. 4, 1936  17 Sheets-Sheet 17

INVENTOR

ATTILIO ERRERA

By Emil Bönnelycke

ATTORNEY

Patented Aug. 29, 1939

2,171,492

UNITED STATES PATENT OFFICE 2,171,492

COIN COLLECTING AND OBJECT DISTRIBUTING MACHINE

Attilio Errera, Turin, Italy

Application February 4, 1936, Serial No. 62,369
In Italy July 26, 1935

26 Claims. (Cl. 194—85)

This invention relates to an automatic machine adapted to be manipulated directly by a user and providing for the delivery of tickets or articles having any desired value within a certain range of values depending upon the organization of the machine, by means of a selective setting manipulation and insertion by such user of a variable amount consisting of coins of various denominations within given ranges such coins being introduced in any preferred order in the machine; the machine may also be adapted to deliver coins forming the change between such amount so introduced in the machine and the value of the delivered article or ticket.

The machine of this invention is contrived to be arranged for the desired number, even if materially large, of values corresponding to selective deliveries to be effected such values being selected at will within the range of the machine, and it provides for insertion of coins in several combinations which may be of practical use, while it refunds coins the operator could introduce thereinto over the maximum capacity of the machine; further this machine refunds money without delivery of an article or ticket when the amount introduced thereinto is below the requisite amount or generally is different therefrom when the machine does not include a change coin distributor.

Further the machine of this invention provides for an easy manipulation of the parts directed to deliver the desired articles or tickets, while subsequently it operates automatically to deliver such article or ticket and, if desired, to compute and deliver the change.

On the annexed drawings three embodiments of the present invention are illustrated by way of example and Figure 1 illustrates the whole of the machine and more particularly the control gear, the change computing gear and the gear actuating the change coin distributor in an embodiment of this invention organized for the delivery of tickets with change delivery, said figure being a section on line 1—1 of Fig. 2;

Figure 4 is a similar section on line 4—4 of Fig. 5;

Figure 6 is a fragmentary section on line 6—6 of Fig. 5;

Figure 7 shows in detail an aligning and return device;

Figure 8 illustrates a detail;

Figure 10 illustrates the actuating and return member of a coin totalizing device for coins whose value belongs to a given ordinal, such ordinal being assumed in this embodiment to be the unit ordinal.

Figure 11 illustrates the coin collecting member for coins of a given value in the units ordinal;

Figure 12 illustrates the coin collecting member for coins of another value in said units ordinal;

Figure 13 illustrates the coin collecting member for coins of a further other value in said units ordinal;

Figure 14 illustrates the actuating and return member of a coin totalizing device for coins whose value belongs to a higher ordinal that is to tens ordinal in the illustrated construction;

Figure 15 illustrates a coin collecting member cooperating with the actuating and return member of Figure 14;

Figure 16 illustrates a member driven by the coin collecting member of Figure 15.

Figure 17 is a fragmentary detail view showing the driving means for said totalizing devices;

Figure 18 is a plan view of the same with a part in section.

Figure 19 is a fragmentary view of a portion of Fig. 1 and shows actuating means for the machine.

Figure 20 is a detail view showing a transfer gear intermediate two totalizing devices;

Figure 21 is a view of the gear of Figure 20 in another operative condition;

Figure 22 is a perspective view of the gear of Figures 20 and 21 in a further operative condition.

The apparatus of this invention includes a setting in mechanism of the kind disclosed in my U. S. Patent, No. 2,082,155, of June 1, 1937.

As described in said application to which reference is made in respect of details of the organisation and operation of this mechanism, it includes combinator members and keys arranged to cause, by effect of the manipulation of any selected key and of the operation described in said application, a plurality of setting in members to move through predetermined extents to preset the operation of other parts of the apparatus.

Figure 2:
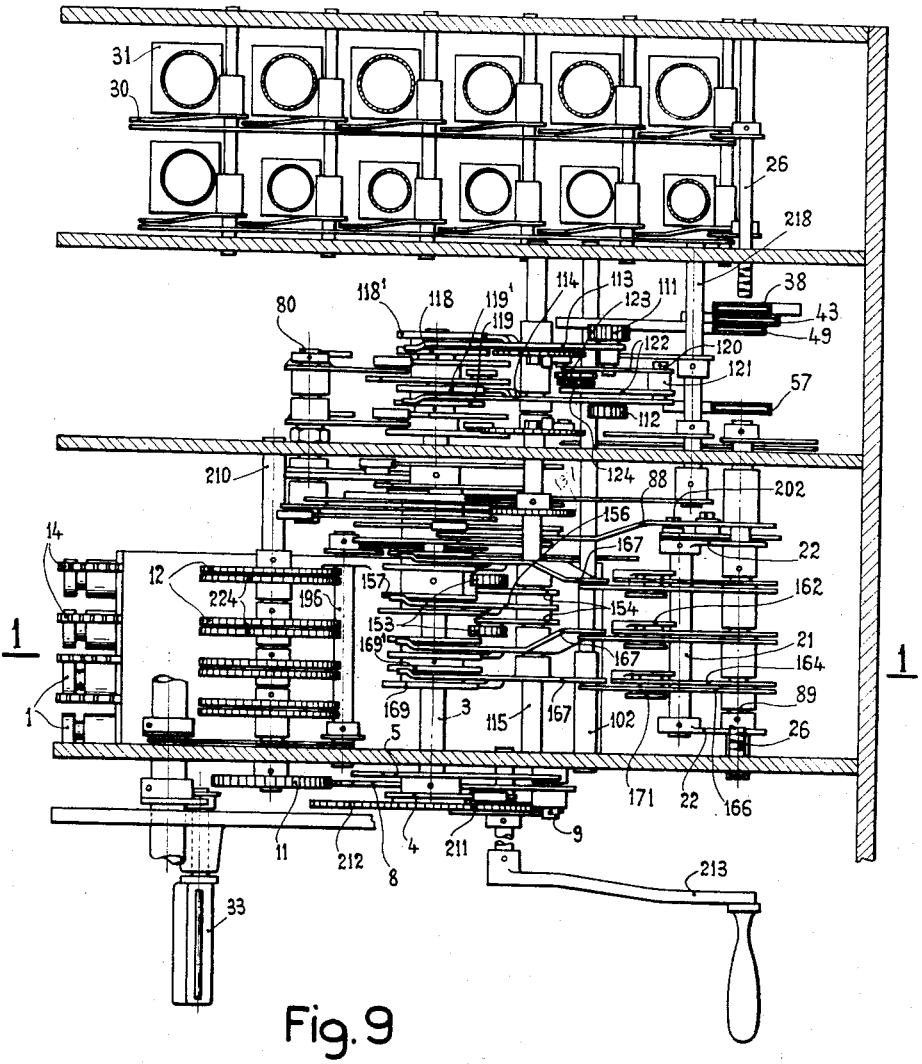
Figure 2 is a plan view of Fig. 1 with a portion in section on line 2—2 of Fig. 1.

More particularly, keys 1 and slide 2 correspond with keys 83 and slide 36 in Figure 2 of said patent and the sets of plates 500 correspond with sets of plates 6, 7, 8, 9 of said application for selective and combined actuation of fingers 501 corresponding with fingers 5 of patent above referred to, while pawls 502-503 correspond with pawls 49 and 52 thereof, and 14 denotes a carriage similar to that at 37 of said Patent No. 2,082,155.

As described in the above stated application, the manipulation of any selected key 1 shifts a plate 500 in one or in each of a number of said sets of said plates, to bring one or more fingers 501 each in the path of a pawl member 502—503 belonging to one of slides 2, it being held in mind that, as fully described in the aforementioned Patent No. 2,082,155, this mechanism includes a slide as 2 for each ordinal or generally for each series of data for which the device is to be set, and a finger as 501 for each digit of each ordinal or for each datum of each datum series.

Each of said pawl members includes a pawl 502 pivoted at 502⁰ on the respective slide 2 and having a side lug 502' and a nose 502'', said pawl being under the action of a spring 600. On pawl 502 a pawl stop 503 is pivoted at 503⁰, it being under the action of a spring 601 operative intermediate it and pawl 502.

A stationary member 602 is fast on the machine frame in register with the path of nose 502'' of the pawl 502 of each slide 2 and has notches 602' for engagement by said nose.

The actuation of several carriages 14, one for each slide 2 and having a recess 14' for cooperation with lug 502' of the pawl 502 of cooperating slide 2, is made by means of cams 4 and 5 (Figs. 2 and 19) of a main cam shaft 3 which act on rollers 6 and 7 of a lever 8 fulcrumed at 9. A toothed quadrant 10 integral with lever 8 drives in its oscillation a pinion 11 fast on a shaft 210 which has a number of pinions 12 fast thereon, each of such pinions driving at each oscillation a respective carriage 14 throughout a full reciprocation.

During the completion of the stroke of each carriage 14 towards right hand (as viewed in Fig. 1) under the described action of the respective pinion 12, the recess 14' thereof is engaged by lug 502' of the pawl 502 of respective slide 2 under the action of spring 600.

Figure 1:
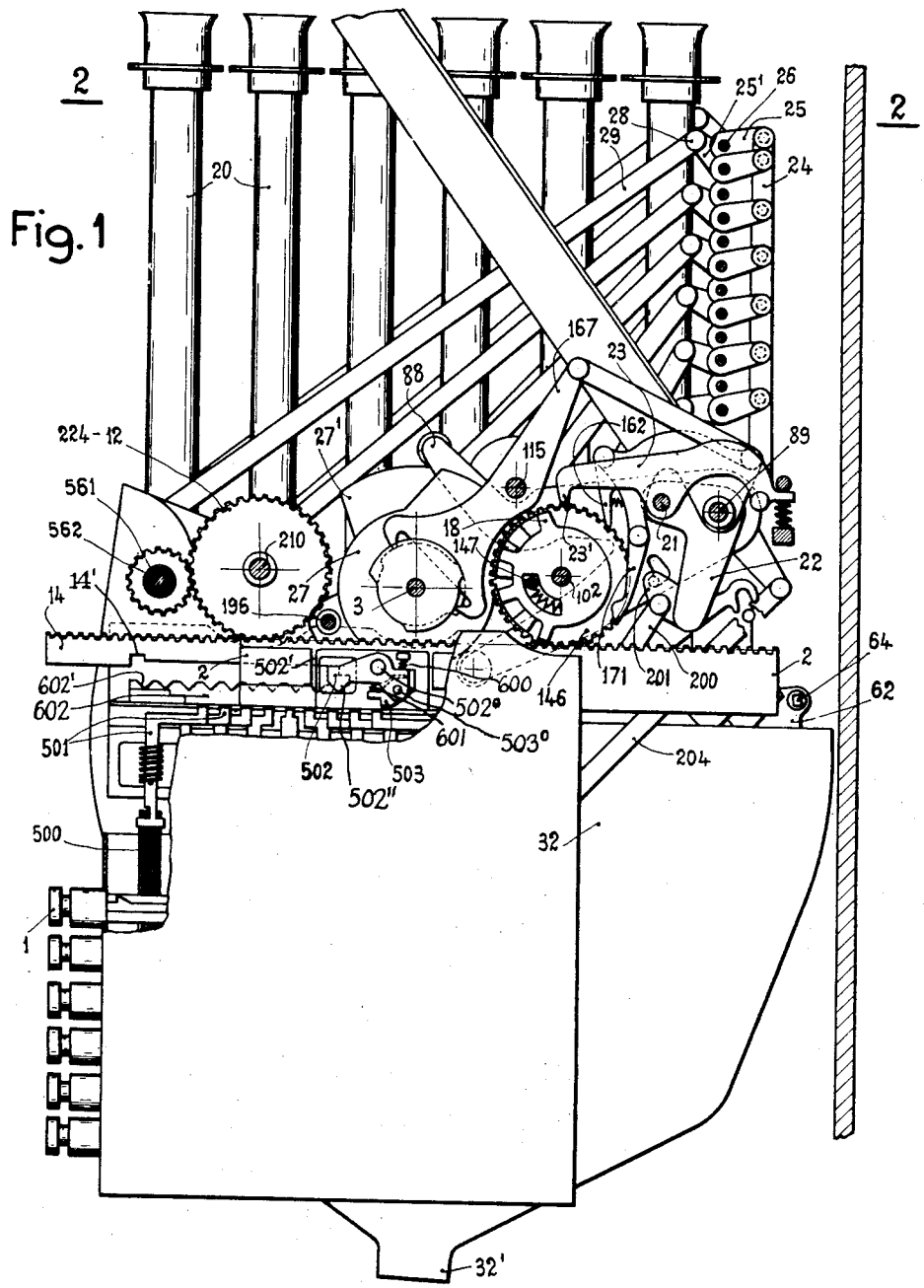

During the stroke in the opposite direction in the reciprocation of said carriage 14, it brings the cooperating slide 2 with it, due to the engagement of the lug 502' of the pawl 502 thereof in the recess 14' of carriage 14, and when stop pawl 503 engages the particular finger 501 which has been caused to protrude in its path as above described, the combined action of lug 502' in the recess 14' and of stop pawl 503 on finger 501 causes the pawl 502 to oscillate counter-clockwise (as seen in Fig. 1) on its pivot 502⁰. Thus, the lug 502' releases the recess 14' and the nose 502'' of pawl 502 engages the opposite notch 602' of stationary part 602, and accordingly the particular slide 2 is stopped after it has moved under the action of carriage 14 through an extent depending upon which particular finger 501 has been made operative in its path.

Each slide 2, in turn, by its edge teeth 13 drives a pinion 145, 146, 152, 161 and a further pinion referenced 224 in respect of all said slides 2, through an angular extent proportional with the slide stroke and therefore depending upon the actuation of fingers 501 and manipulation of selected key 1; said pinions 145, 146, 152, 161 are operative in the machine to pre-set the conditions of operation in accordance with the price of the desired ticket or article, while pinions 224 are intended to actuate respective members of a printing device as hereinafter described and possibly further members as parts of an adding device not shown.

The stop member 503 is mounted as a pawl on main pawl 502 to provide for the free motion of the parts in their rightward stroke (in Fig. 1) irrespective of fingers 501, which may protrude in the path of said pawl during said stroke.

The apparatus also includes a hereinafter described totalizing device (Figures 3-18) which receives coins introduced by the user and shifts driven members to an extent in a ratio with the total amount provided by said coins, the position taken up by such members providing a mechanical representation of the value of the amount introduced by user.

Said totalizing device includes a change computing and delivering device of the kind described in my Patent No. 2,114,559 of April 19, 1938. Said device (Figures 1, 2, 5, 29, 30) includes cams which are moved into different angular positions in accordance with the change to be delivered at each operation of the apparatus and which, at the time of such operation, produce a proper actuation of change coin distributors. Said cams, referenced 16, 17, 18, 19 in Figure 5, correspond substantially, apart from the matters specifically hereinafter described, with cams referenced 30, 31, 32, 33 in the specification of Patent No. 2,114,559.

Said change coin distributors include coin magazines 20 (Figures 1, 2, 29) which correspond with magazines 59 of Patent No. 2,114,559 and coin ejectors 31 and respective driving means 21, 22, 23, 23', 24, 25, 26, 25', 28, 29, 30 corresponding with ejectors 61 and their actuating parts 37, 36, 40, 40', 44, 48, 49, 48', 50, 62 of said Patent No. 2,114,559. The outlets of change coin magazines open in a chute 223 leading to a cup 91 free for user's access.

At a timed instant of the operation cycle the cams 27, 27' of the main cam shaft 3 (Figures 1, 27 and 28) actuate an arm 88 by acting on rollers 224 and 225 pivoted thereon and therefore they cause a shaft 89 solid therewith to oscillate. Said shaft 89 drives a frame, consisting of arms 22 solid with said shaft 89 and a spindle 21 carried by said arms, to move levers 23 loose on spindle 21 towards respective cams 16, 17, 18, 19 and to be oscillated thereby or not according to the particular portions of individual cams which are in front of noses 23' of said levers. Therefore, the levers 23 actuate rods 24 and respective change distributors or not in accordance with the position of cooperating cams 16, 17, 18, 19.

The cams 16 and 17 which are driven by the coin totalizing device and in the first period of operation take a position depending upon the amount formed by the coins which have been introduced in the apparatus, are subsequently coupled with the means setting in the item to be collected, said coupling being effected by a hereinafter described mechanism which carries the cams in ordinals to which the coins introduced in the apparatus pertain, in positions corresponding with the difference between the introduced amount and the amount to be collected by the apparatus. The position taken by cams 16 and 17 is made dependent, if required, on the position of other cams 18, 19 belonging to lower ordinals while the position of the last named cams in the described construction depends only upon the mechanism devoted to set in the item to be collected.

The mechanism thus computes the change to be delivered and in the subsequent operation said cams 16, 17, 18, 19 cause the delivery of proper change coins when change is to be delivered while the position of said cams is operative on the coin collecting and ticket delivering devices to hold them inoperative when the amount introduced in the apparatus is short with respect to the item which has been set in in the machine manipulation.

In an embodiment of this invention not including change delivery means, said cams hold the coin collecting and article or ticket delivering devices inoperative when the introduced amount is not identical with the item to be collected.

The coins introduced in the machine are delivered from the totalizing device to a collecting hopper 32 which leads them into a duct 90 (Fig. 29) opening in a coin collecting magazine (not shown) adapted to be opened by an authorized operator, or in a duct 214 opening into the cup 91 for refund to user when conditions for their collection or for article or ticket delivery are not complied with. Further a guide 33 leads to a duct 215 and consequently to the coin collecting magazine any ticket which has been issued by effect of a manipulation causing the coins introduced in the machine to be refunded to user. On the contrary, when the machine has been correctly operated said guide leads the issued ticket to duct 216 opening in the cup 91 for delivery to user.

The machine comprises a ticket printing and issuing device which may be of any selected type, a construction of such device being hereinafter described by way of example with reference to Figures 40 and 41. The type wheels of said devices are carried into proper position by the item setting-in device manipulated by user and the ticket printing and issuing means are timely actuated by the machine parts. Said ticket printing and issuing means are operated at each manipulation of the machine and when a printed and issued ticket is not to be delivered it having on the contrary to be collected in the coin collecting magazine, said printing means cancel it by affixing a cancellation writing thereon.

The timed operation of the several devices of the machine is carried out by means of a set of cams actuating the several devices in the required sequence and time relation and along requisite periods; said cams are driven into rotation by the main cam shaft 3 which in the described construction is assumed to be actuated by a crank handle 213 and a reducing gear 211, 212.

Of course the machine may be driven by an electric motor by the intermediary of an automatic release clutch, of known construction, which cuts the current supply to said motor when a cycle of operation is completed. In such a construction the feeding circuit of said motor is closed automatically by the setting-in key 1 which has been manipulated by the user, one of the parts actuated by said key being operative in the last portion of the key stroke to close a switch controlling said circuit.

In the construction illustrated in Figures 1–29 the totalizing device (Figures 3–19) is contrived for coins of four different denominations and it is divided in two sections, each correponding with one ordinal (units and tens ordinals). In its operation it totalizes the products of the numbers of several coins introduced therein by their respective unitary value or denomination and produces, by the intermediary of a tens transfer gear, a stroke of respective driven members pertaining to several ordinals (two ordinals in the described construction) through angles proportional with the total amount of introduced coins. Said displacements are thereafter imparted to parts of a differential gear devoted to automatically compute the change and to actuate the change delivery device.

The section of the totalizing device devoted to units ordinal (Figs. 3, 5, 11, 12, 13) includes a quadrant 34 intended for coins of lowest denomination, say one unit. Said quadrant is loose on a shaft 92 rotatably supported in partitions 35 and 36 of the machine frame. The quadrant 34 carries at its periphery an arc-shaped chamber 37 intended to receive in one of its ends the coins which are introduced by the operator and are fed thereto by a duct 38 while the opposite end of chamber 37 is closed at 39. One of the front or arc-shaped walls of chamber 37 has an arc-shaped slot 40 therein. A finger 46 is fast on said quadrant 34 for the hereinafter described purpose.

A further quadrant 41 is loose on shaft 92 adjacent the quadrant 34 and has an arc-shaped chamber 42 whose mouth is in register with a duct 43 while the opposed end of chamber 42 is closed at 44. The quadrant 41 is devoted to coins having a higher denomination with respect to coins to which the quadrant 34 is devoted. In the illustrated construction the quadrant 41 is devoted to two-units coins and it has an arc-shaped chamber 42 for collecting such coins, one of the front walls of said chamber having an arc-shaped slot 45 through which said finger 46 of quadrant 34 may move and extends into chamber 42. A finger 52 extends from quadrant 41 for cooperation with subsequent parts of the device as hereinafter described.

A disk 47 is loose on shaft 92 adjacent to quadrant 41 and operates as suggested in respect of quadrants 34 and 41 and carries an arc-shaped chamber 48 intended to receive the coins of further higher denomination in unit ordinals, say five units coins, through a duct 49. The chamber 49 is closed at 50 and has an arc-shaped slot 51 through which said finger 52 of quadrant 41 may move and extends into the chamber 48. The rim of disk 47 has teeth 53.

A driving arm 62 solid with shaft 92 carries a finger 63 adapted to move through the arc-shaped slot 40 of chamber 37 of quadrant 34 and extending into said chamber.

The driving arm 62 is provided with three fingers 64, 65, 66 adapted to engage the closed ends 39, 44, 50 of chambers 37, 42, 48 respectively. Said fingers 64, 65, 66 are intended to drive anticlockwise the quadrants 34 and 41 and the disk 47, respectively. Quadrants 34 and 41 are provided with arc-shaped slots 67 and 68 in register with finger 66 intended to engage the closed end 50 of chamber 48 of disk 47, said slots providing for free motion of said quadrants and finger.

A further quadrant 54, loose on shaft 92 (Figures 4, 5 and 15), corresponds with coins pertaining to higher (tens) ordinal with respect to parts 34, 41, 47 and has an arc-shaped chamber 55 which is closed at 56 and receives coins from duct 57. In register with the mean radius of arc-shaped chamber 55 is provided an arc-shaped slot 58 and an adjacent arm 60 solid with a sleeve 61 loose on shaft 92 carries a finger 59 adapted to move through slot 58 and extend into chamber 55.

On sleeve 61 and adjacent the quadrant 54 is a loosely mounted disk 69 having teeth 75 and notches 69' in its periphery. A finger 70 extends frontally from said disk 69 for engagement by a cooperating front finger 71 solid with quadrant 54. Said quadrant 54 has an arc-shaped slot 72 extending along the circle where finger 71 is located.

The arm 60 cooperating with quadrant 54 has a finger 73 operative on the end 56 of the chamber 55 of quadrant 54, and a further finger 74 able to move through the slot 72 of quadrant 54 to engage finger 70 of disk 69 on its face opposed to that engaged by finger 71 of quadrant 54.

The driven members of the totalizing device are provided with brake means comprising plates 76 (Figure 6) loose on stationary rods 77 and loaded by springs 78. Said brake means prevent any overstroke of said members at the time of their actuation as could happen owing to their momentum due to comparatively heavy weight of coins they may be loaded with. Said brake means also serve to hold said members in the positions they have been carried into and in which they discharge the coins contained therein before being restored in position by fingers 64, 65, 66, 74, 73. As illustrated said brake plates 76 are operative on disks 47 and 69 and on quadrants 34, 41 and 54.

Figure 9:
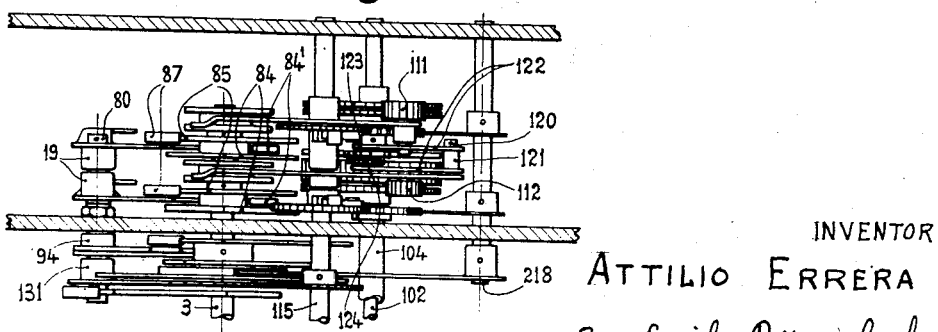
Figure 9 is a fragmentary plan view of Figures 4 and 7.

The driven disks 47 and 69 of the totalizing device are provided with aligning means intended to align and lock them in the correct angular position they must take by effect of different angular displacements they receive from the totalizing device. Said aligning means, which are illustrated in Figs. 4 and 9 in cooperation with disk 69, include an arm 79 loose on shaft 80 and actuated by a spring 81 having one end engaged with the machine frame under the control of cams 84, 85 by the intermediary of the finger 86 and roller 87 carried by arm 79 and of a further roller 84' carried by cam 84.

When the cams 84 and 85 have been carried in operative position by the main shaft 3 on which they are fast, the cam 84 releases arm 79 which moves under action of spring 81 and then the nose 79' of arm 79 engages that of aligning notches 69' provided on a portion of the rim of disk 69 which is opposite to it and immediately locks said disk in its correct position. The arm 79 is permanently held in its correct position by the cooperation of the rims of cams 84 and 85 with finger 86 and roller 87.

Immediately before the disk 69 is required to start its return stroke, the roller 84' cooperating with a slope 79'' of arm 79 moves the said arm 79 into its inoperative position and releases the nose 79' from cooperating notch 69' of disk 69.

Teeth 53 of disk 47 which cooperate in the operation of the totalizing device extend over a large portion of the periphery of said disk. Accordingly, for the purpose of cooperation with respective aligning nose, not shown and similar to that of 79', a further disk 47' is solid with disk 47 said disk 47' having a plurality of notches at its periphery for cooperation with means similar to parts 79, 79'; the aligning means cooperating with disks 47, 47' are identical to means described in connection with disk 69 and accordingly they are not described in detail nor illustrated.

The position of chambers 37, 42, 48, 55 and the respective sizes of mean radius of arc-shaped slots 40, 45, 51, 58 of said chambers along which fingers 63, 46, 52, 59 move are selected in accordance with sizes and unitary values of coins of different denominations the totalizing device is provided for, in such a manner as the angle having its apex on the axis of shaft 92 and its sides embracing one coin located in the respective chamber and tangent thereto, is proportional with the denomination of such coin according to an invariable ratio which represents an angle equivalent to amount "one" in the monetary system in respect of which the machine is organised. Accordingly, in the illustrated embodiment and in the assumption that the three chambers 37, 42, 48 correspond respectively with coins whose denominations are one unit, two units and five units such coins having different diameters as found in practice in all existing monetary systems, the arc corresponding with a one-unit coin in chamber 37 of quadrant 34 has an angular extent of 9° while the arc corresponding with a two units coin in chamber 42 of quadrant 41 has an angular extent of 18° and the arc corresponding with a five units coin in chamber 48 of disk 47 has an angular extent of 45°.

The chamber 55 of quadrant 54 devoted to ten units coins is arranged in such a manner that an angle of 9° again corresponds with one ten units coins in view of the fact that said quadrant 54 is operative in respect of a (tens) ordinal higher than the (units) ordinal the three quadrants 34, 41, 47 are devoted to and accordingly an angle of 9° in said quadrant 54 corresponds with a 90° angle in the next lower ordinal.

The peripheral extent of chambers 37, 42, 48 is selected in such a manner as they are adapted to receive a predetermined number of coins of respective denominations. In the exemplified construction said chambers are adapted to contain respectively four one-unit coins, three two-units coins and two five-units coins, as far as the units ordinal is concerned. As to tens ordinal, the chamber 55 may receive two ten-units coins.

Figure 3:
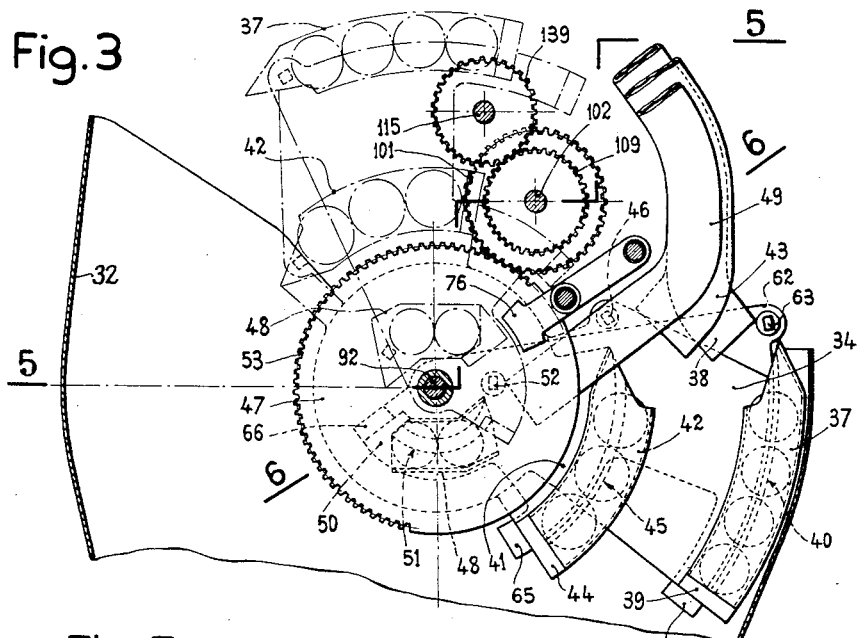
Figure 3 is a detail section of the coin collecting and totalizing device on line 3—3 of Figure 5.

In inoperative position (as illustrated in Figure 3) the distance intermediate the inlets of chambers 37, 42, 48 and 55 and the outlets of respective ducts 38, 43, 49 and 57 conveying coins thereto, is such that the coins which may be introduced in excess in said ducts over the number which may be introduced in said ducts, after the respective chambers are entirely filled fall into the collecting hopper 32 and through its orifice 32' and the duct 214 opposite thereto, they further fall into cup 91 for immediate refund to user, without being operative in the machine.

The arc through which the chambers 37, 42, 48 are respectively oscillated by the hereinafter described means after coins have been introduced thereinto for the operation of the totalizing device is such that when said oscillation is completed, the mouths of said chambers are in condition to permit the coins located therein to fall into the collecting hopper 32 (see the chain line position in Figure 3).

As far as the chamber 55 devoted to ten units coins is concerned, it is necessary, for the purpose that the coins it contains may fall off, that chamber 55 and quadrant 54 carrying it are able to move from their coin collecting position through an angle having a materially larger extent than the angle (18°) corresponding with the digit said two coins provide in their (tens) ordinal. For such a purpose a lost or dead motion engagement is provided intermediate the quadrant 54 and the toothed disk 69 driven thereby. Said dead motion engagement is provided by fingers 71 and 70 between which when in their inoperative position a distance intercedes which enables the mouth of chamber 55 to move from its collecting position (full line position of quadrant 54) up to a discharge position on the opposite side with respect to vertical (chain line position of quadrant 54) during the totalizing operation as necessary for exit of coins therefrom, while the actuation of finger 70 and toothed disk 69 by the finger 71 of quadrant 54 occurs only in the last portion of the oscillation of said quadrant 54.

Arms 62 and 60 carrying out the operation of the totalizing device and which are solid with shaft 92 and sleeve 61 respectively, are driven by the main cam shaft 3 with the requisite timing and by the cooperation of cams 93, 93' (Figures 17 and 18) operative on a lever 94 which is loose on shaft 80 and has loose rollers 95 and 96 adapted to be actuated by said cams.

The lever 94 is connected with two toothed quadrants 97 and 98 which drive respectively a toothed quadrant 99 solid with sleeve 61 and arm 60, and a pinion 100 solid with shaft 92 and arm 62.

The intermeshing quadrants 97 and 99 are provided with teeth on such an extent of their periphery as the oscillation of lever 94 causes the arm 60 to move through the requisite angle (that is from its full line position up to chain-line position in Figure 4); thereafter the smooth portions 97', 99' of quadrants 97, 99 engage with each other, and sleeve 61 and arm 60 are left stationary.

The quadrant 98 which drives the pinion 100 and therefore the shaft 92 and arm 62, has such an angular extent as to cause said arm to move through such angle as included between its full line position and the chain line position in Fig. 3. Accordingly the stroke of arm 62 begins at the same time as that of arm 60 and continues after arm 60 has come to rest due to interengagement of smooth quadrants 97' and 99'. The transfer from units ordinal to tens ordinal occurs in the last named period, as hereinafter described.

The constant angle the arm 60 is moved through at each operation of the machine by the parts 94, 97, 99, 61 (Figures 17 and 18) is designed having in mind that when the chamber 55 is entirely empty, the arm 60 when operated in the above described manner must bring its finger 59 moving through the arc-shaped slot 58 of said chamber 55 against the end wall 56 of chamber 55 and further said arm 60 must drive the quadrant 54 by its finger 59 until the finger 71 of said quadrant is in contact with finger 70 of disk 69, however without driving the last named finger 70 and disk 69. By such a structure, when no coin has been introduced in chamber 55 in a given manipulation of the machine, the disk 69 is not moved—that is, the driven member of the section of the totalizing device devoted to tens ordinal remains in its zero-position, while when one or more coins of proper denomination have been introduced in the chamber 55, the finger 59 is operative on the end wall 56 of chamber 55 through such coin or coins located intermediate them, and the toothed disk 69 is moved through an angle depending upon the particular number of coins introduced in said chamber and more particularly through an angular extent of 9° for each of such coins, in view of the position or radius of chamber 55 as hereinbefore described. The angle through which the disk 69 is moved is therefore 18° in the conditions illustrated in Fig. 4 where two coins are assumed to have been introduced in said chamber 55.

Similarly the constant angle the arm 62 is moved through at each operation of the apparatus is designed in such a manner as, assuming all the chambers 37, 42, 48 to be empty, the finger 63 of arm 62 after its full stroke throughout slot 40 engages the end wall 39 of chamber 37 and then it drives said quadrant 34 until the finger 46 of this quadrant has moved throughout the slot 45 of chamber 42, said fingers 63 and 46 and intermediate parts then driving the quadrant 41 to such an extent that the finger 52 of the quadrant 41 after having moved throughout the slot 51 of chamber 48 comes to rest just in front of end wall 50 of chamber 48 without driving the disk 47. In the above stated conditions when all chambers 37, 42, 48 are empty, an oscillation of arm 62 causes no movement of toothed disk 47 and this section of the totalizing device remains in zero-position. On the contrary, when coins have been introduced in respective chambers 37, 42, 48 the fingers 63, 46, 52 drive the cooperating quadrants 34, 41 and disk 47 through the intermediary of the coins located between said fingers and the end walls of associate chambers. Therefore the constant-amplitude oscillation of arm 62 will drive the disk 47 through an angle depending upon such coins as have been introduced in the machine in each particular operation. This angle is the sum of an angle proportional with coins inserted between parts 63 and 39 added to an angle proportional with coins located intermediate parts 46 and 44 and to a further angle proportional with coins introduced intermediate parts 52 and 50.

As above described, in the exemplified construction the proportionality ratio is 9° in respect of each units coin located in chamber 37 while it is 18° in respect of each two units coin located in chamber 42 and 45° for each five units coin located in chamber 48. In the conditions illustrated in Fig. 3 where the chambers 37, 42, 48 are assumed to have been filled each with the maximum permissible number of coins of respective denominations, in the operation of the totalizing device the disk 47 will be moved through an angle of 180° (say 4×9°+3×18°+2×45°).

During the return stroke of arms 60 and 62 under the action of quadrants 97, 98 and of cams 93, 93' (Figure 17) while the parts 34, 41, 47, 54, 69 are held stationary by brake plates 76 (Figure 6), the arms 60 and 62 move back idly over a certain angle without driving associated parts because the angular distance between fingers 59 and 73 and between fingers 63 and 64, respectively, are larger than the angular extents of intermediate chambers 55 or 37 and also due to the respective positions of cooperation of fingers 46, 52 and 65, 66 when they have reached their full stroke condition. Therefore fingers 73, 64, 65, 66 engage end walls 56, 39, 44, 50 of respective chambers 55, 37, 42, 48 after each finger 59, 63, 46, 52 has moved off from the mouth of cooperating chamber to permit for the exit of coins which then fall down by gravity into the collecting hopper 32.

The arm 60 acts by its fingers 73 and 74 on the end wall 56 of chamber 55 and on the finger 70 of disk 69 respectively to restore quadrant 54 and disk 69 to their inoperative positions illustrated in full lines in Figure 4. The arm 62 is operative in similar manner by its fingers 64, 65, 66 on end walls 39, 44, 50 of chambers 37, 42, 48 to restore the parts 34, 41, 47 in their full line positions in Figure 3.

By the described device angular movements are secured of disk 47 and disk 69 each through a respective angle which is proportional with the amount afforded by coins which have been introduced in the respective sections of the totalizing device, the described operation being independent of the order in which coins have been inserted in the respective ducts and chambers.

As above stated, the angular displacement of disk 47 may correspond with amounts in excess of nine units in the ordinal to which said disk pertains, and in view of such circumstance the machine includes a tens transfer gear operative to transfer on the driven member of tens ordinal the units of such tens ordinal as are due to such excess angular displacements of disk 47, in accordance with the fact that the amount introduced in machine, the totalizing device, the setting in mechanism, the differential change computing mechanism and the change distributor are sectioned according to several ordinals of the numerical system the machine is organized for.

Said transfer gear is illustrated in Figs. 4, 5, 20, 21, 22.

The teeth of disk 47 providing the driven member of the totalizing device in units ordinal, are in mesh with a pinion 101 loose on a shaft 102 parallel with the shaft 92 of said disk. Similarly, teeth 75 of driven disk 69 of tens ordinal are in mesh with a pinion 103 loose on sleeve 104 which in turn is loose on shaft 102. The shaft 102 and sleeve 104 are intended to impart to cooperating members of the differential device the actuations corresponding with amounts introduced in the machine in the form of coins belonging to said two ordinals.

A hub 105 is fast on shaft 102 and carries two pinions 106, 107; the pinion 106 is located adjacent the pinion 101 and pinion 107 has spaced teeth adapted to actuate a Geneva-pinion 123 as hereinafter described. A pinion 108 is fast on sleeve 104 and is located intermediate pinions 103, 107. A further pinion 109 is fast on hub 105 and a pinion 110 is solid with sleeve 104. The two last named pinions are intended to cooperate with means for restoring shaft 102 and sleeve 104 into their zero-position and for aligning them in correct angular positions as hereinafter described.

The transmission and transfer gear (Figs. 4, 20, 21, 22) includes a loose pinion 111 adapted to couple the two pinions 101 and 106 in order to provide for transmission from pinion 101 and consequently from disk 47 unto shaft 102 and pinion 107; said gear also includes a loose pinion 112 intended to couple pinions 108 and 103 for transmission from disk 69 unto sleeve 104.

The two pinions 111, 112 are loose on support arms 113, 114 mounted to oscillate on a shaft 115 and acted on by return springs 116, 117 having one of their ends connected with stationary parts of the machine frame. Said arms 113 and 114 are actuated by a twin cam 118, 118' and 119, 119' respectively, said cams being fast on main cam shaft 3 and having the configuration and respective angular position illustrated and hereinafter described.

On a pivot pin 120 fast on the end of arm 114, a support is mounted to oscillate said support consisting of a sleeve 121 and two arms 122; in the free ends of said arms a transfer gear is loosely pivoted which includes a Geneva-cross pinion 123 and a pinion 124 integral therewith; an elongated slot 125 is provided in the arm 122 at a location intermediate its ends and adjacent arm 113, and a finger 126 fast on arm 113 engages said slot 125.

Pinion 124 is in mesh with pinion 108 while the Geneva-cross pinion 123 is intended to be engaged by teeth 107' of pinion 107 (Fig. 20 and 21) such teeth being two in number to cause the pinion 123 to move twice through one step in respect to each revolution of pinion 107. This arrangement accounts for the facts that in view of practical requirements pinions 101, 106, 107, 108, 103 have such a diameter that one half revolution of each of said pinions corresponds with ten units of respective ordinal, and that in the described construction the units ordinal totalizer section is adapted to operate in respect of amounts up to twenty units and accordingly it is required to cause two tens transfers that is one transfer in respect of each displacement thereof through 180°.

The operation of the described transfer gear as hereinafter described occurs under actuation of cams 118, 118' and 119, 119' which operate arms 113 and 114 and under the combined action developed by the arms 113, 114 on support 121, 122 which carries the pinions 123, 124 of the transfer gear.

During the described operation of the totalizing device and of actuating means therefor (Figures 17, 18) and the angular motions of toothed disks 47 and 69 and consequent motions of pinions 101, 103 driven thereby, pinions 101, 103 firstly move in unison under the action of respective parts of the totalizing device, and thereafter pinion 103 comes to rest with disk 69 while the disk 47 and parts driven by it are further moving through their own motion.

Due to the configuration of their rims and cooperation of springs 116, 117, the cams 118, 118' and 119, 119' in the first portion of their operation hold both arms 113, 114 in their position in which they hold the respective cooperating pinions 111, 112 engaged respectively with the two pinions 101, 106 and with the two pinions 103, 108 in order to impart to the shaft 102 and sleeve 104 the motions of the respective sections of the totalizing device.

In said operation (Figure 20) in which both arms 113, 114 are in their down position, the support 121, 122 carrying the transfer gear (said support being connected at 120 with arm 114 and with arm 113 at 125, 126) holds the pinions 123, 124 spaced and out of mesh with respect to pinions 107, 108, the shaft 102 and sleeve 104 being able to move forward independent of each other through an angle corresponding with the operation of respective sections of the totalizing device.

Assuming that a number of coins has been introduced in the chambers 55, 37, 42, 48 of the totalizing device to entirely fill each of them with coins of respective denominations, when the disk 69 has been moved through the angle corresponding with two steps, that is with two units in the tens ordinal in view of the construction of the apparatus the disk 47 has moved through an angle smaller than that corresponding with ten units in the (units) ordinal to which said disk 47 belongs.

At such a time the disk 69 is released from sleeve 104 and the transfer gear 123, 124 is carried in operative position, in order to transfer on sleeve 104 such portion of the displacement of the disk 47 as due to one or more units in the tens ordinal.

For such a purpose (Figure 21) at such time the cam 119, 119' provides for a counterclockwise oscillation of arm 114 under the action of respective spring 117 while the cam 118, 118' holds arm 113 in its previous position. Thus the transmission from pinion 101 to that 106 is held operative by the intermediary of pinion 111 while pinion 112 is removed from pinions 103, 108 and therefore the sleeve 104 is released from disk 69 which is left stationary.

Due to the respective displacements of arms 113, 114 the free end of support 121, 122 which is fulcrumed on pivot pin 120 fast on arm 114 is lifted while said support is connected at an intermediate point by slot 125 and finger 126 with the arm 113 which is stationary. Therefore the support 121, 122 oscillates around pivot pin 120 and then the transfer gear 123, 124 is moved down and engages the cooperating pinions 107, 108; thereafter the pinion 108 and sleeve 104 are moved through one step each time one of teeth 107' of pinion 107 drives the Geneva-cross pinion 123. As above described the pinion 107 includes two teeth 107' spaced through an interval corresponding with ten unitary steps of disk 47 to produce a transfer operation every time the disk 47 has been moved through ten units, in view of the above described conditions.

After the displacement of disk 47 and pinion 107 has been completed, the cam 118, 118' permits arm 113 to oscillate anticlockwise under the action of spring 116 and accordingly the pinion 111 is released from pinion 101, 106 in order to release the shaft 102 from disk 47, while said arm 113 by means of its finger 126 lifts the support 121, 122 and consequently it moves the gear 123, 124 out of mesh with respect to pinions 107, 108.

The operation of the totalizing device which has been above described in the assumption that all the chambers 55, 37, 42, 48 of the totalizing device have been entirely filled with respective coins, develops on similar lines when in one or more of said chambers a number of coins has been introduced which is smaller than their full capacity. In such a circumstance the above described coupling and transfer means are controlled as above described. However, pinions 103, 108 will not be moved angularly when no coin has been introduced in the section of the totalizing device devoted to tens ordinal and when the number of coins introduced in the units ordinal section of the totalizing device is not so large as to cause a transfer on next higher ordinal.

In view of the configuration of cams 118, 118' and 119, 119' illustrated on the drawings, when the machine is in inoperative condition the pinions 111, 123—124 and 112 are out of mesh with respect to pinions 101, 106, 107, 108 and 103, 108, while at the time of operation firstly the coupling of 101 with 106 and of 103 with 108 is made, then 108 is released from 103 and at the same time 107 and 108 are coupled with each other, and finally 101 is released from 106 and 107 is released from 108. All the coupling means are thus restored in their inoperative position and all pinions 111, 123—124 and 112 are out of mesh.

By the described apparatus, shaft 102 and sleeve 104 effect angular movements each of which is proportional with the amount provided in the respective ordinal by the total amount of coins introduced in the machine.

The sleeve 104 and shaft 102 and the parts of the differential device and of the change delivery device connected with said sleeve and shaft as hereinafter described, are timely restored in their inoperative position by means of a toothed quadrant 131 (Figures 7 and 8) loose on the shaft 80 and actuated by the cams 135, 136 of main cam shaft 3 by the intermediary of rollers 133, 134.

The quadrant 131 drives a pinion 137 actuating a shaft 115 while each pinion 109, 110 is in mesh with an idle pinion 139 loose on shaft 115 and coupled with it in a single direction by means of a pawl 140 pivoted on pinion 139 at 141 and operated by a spring 142 bearing on a stud 143 fast on pinion 139, said spring 142 acting to hold said pawl 140 in engagement with one of a row of notches 138 provided in the shaft 115.

The described coupling of pinions 139 with shaft 115 by means of pawls 140 is directed to allow for movements said pinions 109 and 110 connected with shaft 102 and sleeve 104 are required to bring about during the operation of the totalizing device.

A cam 130 integral with main cam shaft 3 actuates an arm 128 fast on a shaft 218 and having two noses 127 adapted to engage teeth of pinions 109, 110 respectively, under the action of a spring 129 having its ends connected with arm 128 and a stationary part of the machine frame. As illustrated on the drawing the cam 130 has a configuration enabling noses 127 to engage pinions 109, 110 as soon as the return motion has been completed, for the purpose of locking said pinions with shaft 102 and sleeve 104 in their inoperative or zero position while said noses 127 release pinions 109, 110 as soon as said main cam shaft 3 starts to rotate.

The differential or change-computing and distributing device is of the kind disclosed in my Patent No. 2,114,559 of April 19, 1938, and it is described in this specification in respect of its cooperation with the means being the subject matter of the present application.

Said device (Figures 5 and 30) includes for each ordinal (that is for ordinals of tens, units, tenths and hundredths in the illustrated construction) a cam as described both in said patent and hereinafter, whose rim has a configuration adapted to actuate, in each angular position said cam may be carried in, such arms 23, 23' and cooperating change coin distributors as may be required to deliver a change being the difference between the amount introduced in the machine and the cash to be collected, the item identifying said cash being set in by the manipulation of keys 1 and the operation of the cooperating mechanism as described in Patent No. 2,082,155 mentioned heretofore.

In the illustrated construction the cam 19 is devoted to hundredths ordinal and in view of the fact that in actual use in shops and trade only 5 and 0 digits are required in this ordinal, the cam 19 is arranged to take two operative positions only, in one of which it actuates a distributor devoted to 0.05 denomination coins, while in its alternative position it is inoperative in respect of such distributor.

Said cam 19 is loose on shaft 102 and is integral with a pinion 145 by means of which it may be carried at each manipulation in the required position by the respective slide 2 and a combinator and selector mechanism controlled by keys 1 of the machine as described in Patent No. 2,082,155 above referred to.

The cam 18 is devoted to tens of hundredths that is to tenths of units and it may be carried in any selected one of ten positions for the delivery of any change amount from 0 to 9 tens of hundredths (inclusive). Said cam 18 is loose on shaft 102 and is connected with a pinion 146 which is driven by one of slides 2 under the selective control of keys 1 and cooperating means. The cam 18 is coupled with pinion 146 with a freedom for a certain angular respective displacement by means of a pin 147 (Figures 23, 24, 25) fast on pinion 146 and a quadrant-shaped recess 148 of said cam and by the intermediary of a spring 149 whose ends abut on said pin and a front face of said recess respectively, in order to provide for an angular motion of cam 18 through one unit step with respect to its control pinion 146 as required to account for the positions of the cam 19 belonging to respectively lower ordinal (positions of said cam 19 corresponding to zero or to a significant digit, that is to digit 5 in connection with the above described cam 19).

The configuration of the cam 18 such (as described in my Patent No. 2,114,559 of April 19, 1938 and hereinafter referred to) as in each of ten different positions it may be carried into by its control means, it selectively actuates the cooperating change coin distributors to deliver an amount being the difference between the next higher unit (that is ten units of the ordinal it belongs to) and the particular digit the amount to be collected shows in such ordinal and said cam is moved to account for.

When a change is to be delivered in the next lower ordinal with respect to ordinal to which cam 18 belongs, said cam 18 is shifted through a unit step (independently of its key-control means and as permitted by the coupling means 147, 148, 149) under the action of a transfer gear whose operation is controlled by the next-lower-ordinal cam 19 as hereinafter described. Said shifting of cam 18 is directed to deduct one unit from the digit the change shows in the ordinal to which cam 18 belongs such unit being devoted to cover the change and the collection in next lower ordinal.

The cam 17 pertaining to units ordinal is mounted with the cooperation of a lost motion coupling including parts 147, 148, 149 as above described, on a hub 150 fast by means of a cotter 219 on shaft 102 which receives from the described totalizing device an angular displacement depending upon the number of units provided by the coins introduced in its respective section; said hub 150 has a pinion 151 fast therewith and located adjacent an identical pinion 152 loose on shaft 102 and driven by one of the slides 2 of the setting in keys 1 and cooperating mechanism.

During the operation of the differential mechanism, the pinions 151 and 152 are coupled by means of a pinion 153 and of a device (Figure 26) comprising an arm 154 loose on shaft 115 and on which said coupling pinion 153 is idle. Said arm 154 is operative to bring the pinion 153 into mesh with the two adjacent pinions 151 and 152 and to remove it therefrom, under the action of arm 156 solid with arm 154 and of twin cam 157 solid with shaft 3.

A transfer gear is located intermediate the cam 18 devoted to tens of hundredths and cam 17 devoted to units. Said gear is similar to the gear operative between the cams 19 and 18 and it shifts the units cam 17 through one step in a direction to reduce by one unit the change delivered by it, when the cam 18 of next lower ordinal is in any of its change delivery position, that is it is in any position other than its no-change-delivery one.

The cam 16 devoted to tens of units is loose on hub 158 and is coupled therewith by lost motion means 147, 148, 149 as described. The hub 158 is fast with the sleeve 104 by means of a cotter 159. Said sleeve 104, as described, is actuated directly by the section of the totalizing device devoted to coins of the tens ordinal and it may also receive a transfer from shaft 102 devoted to units in the totalizing mechanism by the intermediary of the above described transfer gear 111—126 (Figures 4, 20, 21, 22).

Figure 26:
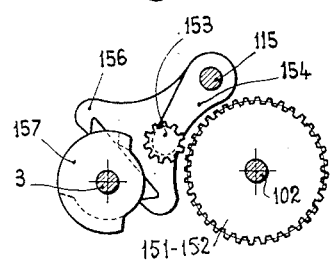
Figure 26 is a detail view of a pinion coupling gear and of its actuating means.

A pinion 161 identical with a pinion 160 solid with hub 158, is loose on shaft 102 adjacent said pinion 160 and is driven by one of slides 2 of the setting in mechanism; a coupling pinion (not shown) cooperates with said pinions 160, 161 said coupling pinion being supported and controlled in the manner described in respect of pinion 153 (Figure 26).

The two cams 17 and 16 are actuated respectively by shaft 102 and sleeve 104 so as to be carried in positions in which they are in conditions to cause the delivery of a change equal to the amount introduced in the machine in the event of a no-collection manipulation thereof, that is assuming the machine is operated after an amount of coins has been introduced therein, but without any of keys having been manipulated. On the contrary, in regular operation as hereinafter described said cams are spaced from said no-collection position through an angular extent corresponding with the collection to be effected by the machine.

Owing to the described organisation and operation of the totalizing mechanism, the units cam 17 is arranged to be able to take any of twenty positions (from 0 to 19) while the tens cam 16 is able to take any of five positions (from 0 to 4).

In the cam 17 the configuration of its portions in register with several positions from 1 to 10 inclusive are equal to those from 11 to 0 inclusive, in view of the fact that due to structural requirements and as above described, the pinions 145, 146, 151, 152, 160, 161 have such a diameter as one half revolution of each of said pinions corresponds with ten units of the respective ordinal; therefore the configuration of the cam 17 is distributed over one half of the periphery of said cam and is duplicated on said periphery. The cam 17 actuates a transfer gear which on said cam going beyond its zero position in the direction of increase of collection, causes the cam 16 of the next higher ordinal to move forward through one unitary step in the direction of collection increase for the described purpose.

The transfer gear located intermediate the subsequent cams is hereinafter described with reference to Figures 5, 23, 24 and 25 in connection with the gear intermediate cams 17 and 16, having in mind that the transfer gears provided and operative between cams 19 and 18, and 18 and 17 are organised and operative in a similar manner. Said gear includes a pawl 162 pivoted at 163 on an arm 164 which is loose on shaft 89 and is actuated by a rod 166 which in turn is actuated by a lever 167 loose on shaft 115 and driven by a cam comprising three sections 169, 169', 169'' having a different radii.

The pawl 162 is adapted to cooperate with a ratchet pinion 170 solid with cam 16; a lever 171 pivoted at 172 on arm 164 is in turn adapted to cooperate on one side with two teeth 173, 173' of pawl 162 and on the other hand with a cam 174' of disk 174 fast with the cam 17 of the next lower ordinal.

A spring 175 operative intermediate lever 171 and pawl 162 acts to move this pawl with its nose towards the axis of ratchet pinion 170 and to cause the lever 171 to oscillate clockwise about its pivot pin 172.

Figure 23:
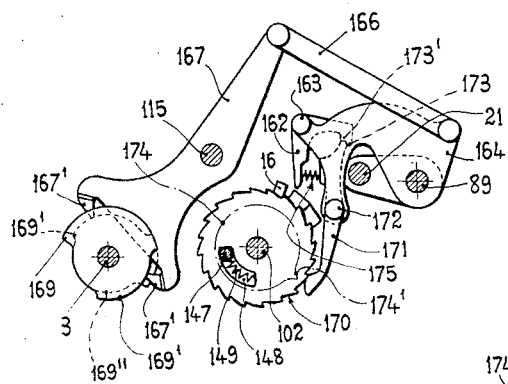
Figure 23 is a detail view of one of transfer gears intermediate subsequent sections of the device devoted to compute the change and to control the actuation of the coin collecting means and of the ticket and change coin delivering means.

At the beginning of a cycle of operation the described transfer gear is in the positions illustrated in Figure 23, that is the two noses 167' of lever 167 are both in engagement with portions of the intermediate rim 169' of the cooperating cam 169. The pawl 162 is engaged at 173 and 173' with the lever 171 which holds said pawl in its inoperative position against the action of spring 175, while lever 171 is, in turn, held out of position for engagement by cam 174' of disk 174 of the cam 17 of next lower ordinal.

In the first portion of the cycle in which the totalizing device is operative and cams 16 and 17 are actuated thereby, the cam 169 holds its arm 164 in the position of Figure 23, the lever 171 thus engaging pawl 162 while said lever 171 is out of position for engagement by the cam 174' of disk 174.

Figure 24:
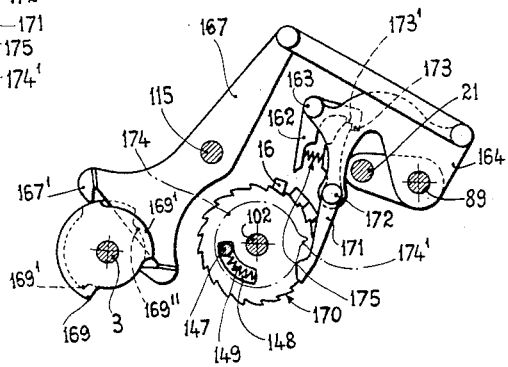
Figure 24 is a detail view of the gear of Figure 23 in a different operative position.
Figure 25:
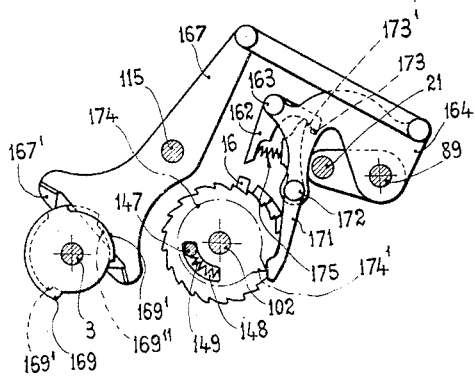
Figure 25 is a further detail view of the gear of Figs. 23 and 24 in a further different operative position.

After the operation of the totalizing device has been completed and before the differential mechanism is made operative, the cam 169 by its sections 169 and 169'' brings the arm 164 and lever 171 in their positions shown in Fig. 24 the lever 171 being thus capable of being engaged and shifted by cam 174' of the disk 174. When the cam 17 moves through an angular extent in respect of which the transfer gear is required to operate, the cam 174' shifts lever 171 which thereupon releases pawl 162 and enables this pawl to take the position illustrated in Fig. 25 said pawl 162 thus coming in position for engagement with ratchet pinion 170 of cam 16.

In the subsequent portion of the cycle and immediately before the hereinafter described operation of the change distributor, the cam 169 causes the arm 164 to oscillate anticlockwise and then the pawl 162 is operative on ratchet pinion 170 and it shifts the cam 16 fast therewith through the requisite angle, the spring 149 being compressed and ratchet pinion 170 with cam 16 being held shifted through one unit step so long as the arm 164 is held shifted by the cam 169. During such motion the pawl 162 follows the particular tooth of ratchet 170 it is engaged with and it oscillates to raise the two teeth 173, 173'; thereafter the top of lever 171 under the action of spring 175 again takes its position shown in Figure 23 and locks the pawl 162 which is thus in position for operation in a subsequent cycle.

The transfer gears located intermediate cams 19, 18 and 18, 17 respectively, are similar to the above described one, apart from the fact that the position of cams 19 and 18 does not depend upon the totalizing device and differential mechanism, they being only dependent upon the setting in mechanism controlled by respective keys 1.

The operation occurs in sequence from the hundredths ordinal unto the tenths ordinal, then from the tenths ordinal unto units ordinal, and finally from the units ordinal unto tens ordinal, because each member is required to be carried into its final position by the transfer gear acting thereon and operated by the next lower ordinal before the operation for transfer unto the next higher ordinal is started, in order that cams 16, 17, 18 will be in their correct position for the delivery of correct change before levers 23, 23' are operated In the last portion of the cycle of operation the levers 167 are again actuated by the intermediate rims 169' of cooperating cams 169 and pawls 162 again take the position illustrated in Figure 23, the ratchet pinions 170 and respective cams again taking their initial position under the action of their springs 149.

Should the lever 171 of a transfer gear not be shifted by the cam 174' of disk 174 of the next lower ordinal cam, it holds its cooperating pawl 162 in such position as it does not engage the ratchet pinion 170 of the cooperating cam and therefore the last named cam is not shifted.

Figure 31:
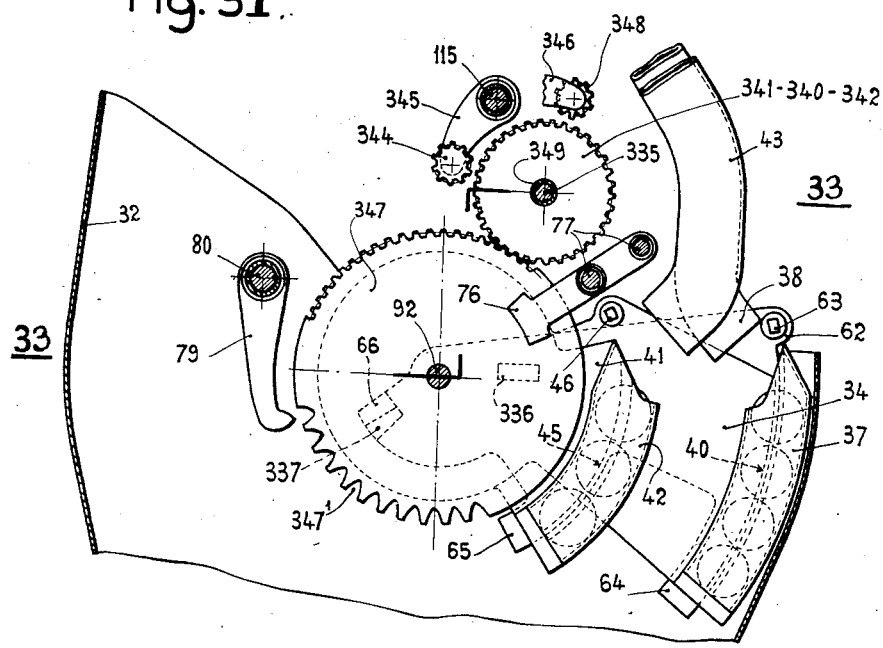
Figure 31 is a fragmentary view of a modified construction of totalizing device with parts in section on line 31—31 of Figure 33.
Figure 33:
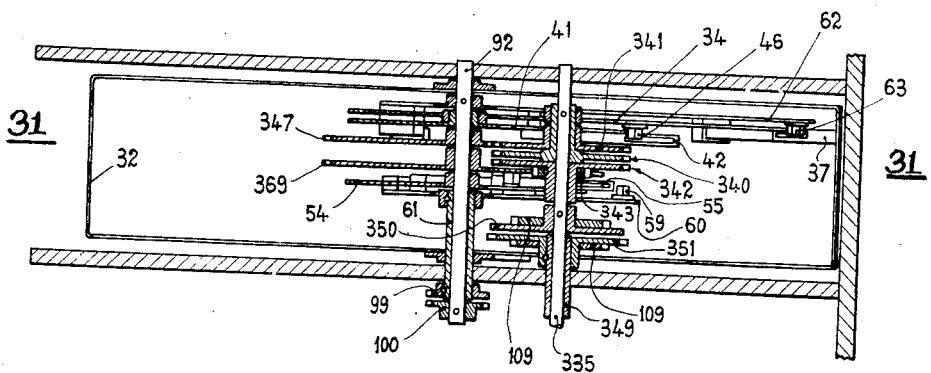
Figure 33 is a section on line 33—33 of Figure 31.
Figure 32:
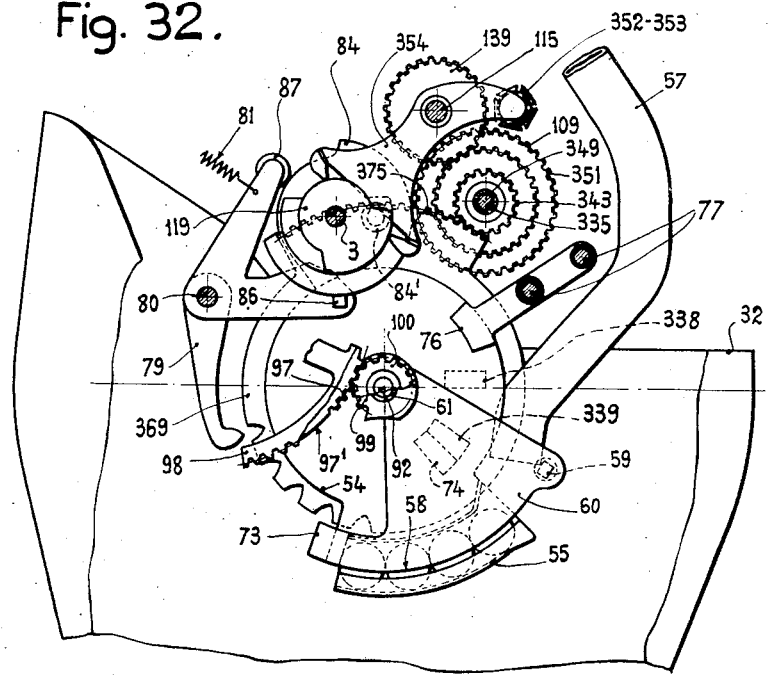
Figure 32 is a fragmentary section view similar to Fig. 31 and made on line 32—32 of Figure 34.
Figure 34:
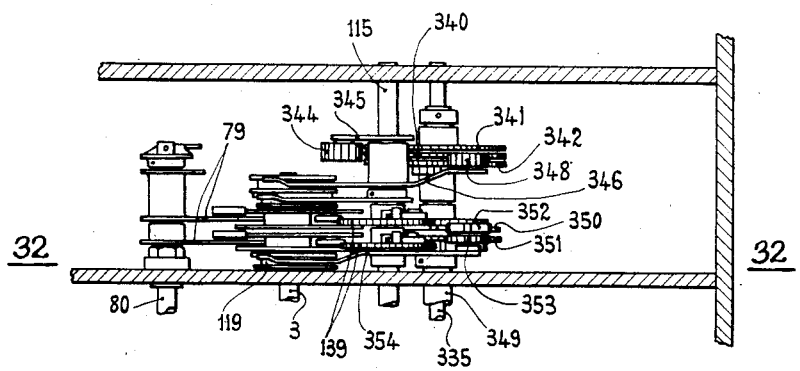
Figure 34 is a fragmentary plan view of Figure 32.

Figure 31 illustrates diagrammatically the cams 16, 17, 18, 19 of the change distributors and the cooperating setting-in pinions 161, 152, 146, 145 which in their whole provide the differential mechanism intended to compute the change.

In Figure 31 said cams are assumed to be developed in a plane and in said representation the hatched regions define the cam projections causing the actuation of the cooperating change coin distributors when such regions take a position in front of levers 23, 23' driving said distributors as disclosed in aforesaid copending application Serial No. 15,895.

The unit ordinal cam 17 is adapted to actuate a distributor of five-units coins, a distributor of two-units coins and two distributors of one-unit coins. As shown diagrammatically the pinion 151 to which the cam 17 is connected by lost motion coupling means 147, 148, 149 is driven by the units shaft of the totalizing mechanism, said shaft and pinion bringing said cam in the position corresponding with the digit the amount introduced in the apparatus shows in the units ordinal.

Having in mind that the totalizing device is organised in such a manner as its units ordinal section may contain coins to form an amount up to "twenty" the configuration of said cam is duplicated on its periphery. The first section of said cam corresponds with amounts from 0 to 9 inclusive being introduced in the apparatus while the duplicated section thereof corresponds with amounts from 10 to 19 inclusive, the "20" position being coincident with the "0" one. Accordingly, one or two transfers may occur in the totalizing device from units ordinal unto tens ordinal by the intermediary of the gear 107, 123, 124, 108 while the cam 17 of units ordinal again has its portions representative of digits from 0 to 9 in operative conditions with respect to levers 23, 23'. The pinion 152 adjacent to that 151 of cam 17 is able to be shifted in proportion with digits 0-9 in units ordinal. Said pinion is actuated in accordance with the digits set in in this ordinal by the cooperating setting in means shown diagrammatically by 176.

Figure 30:
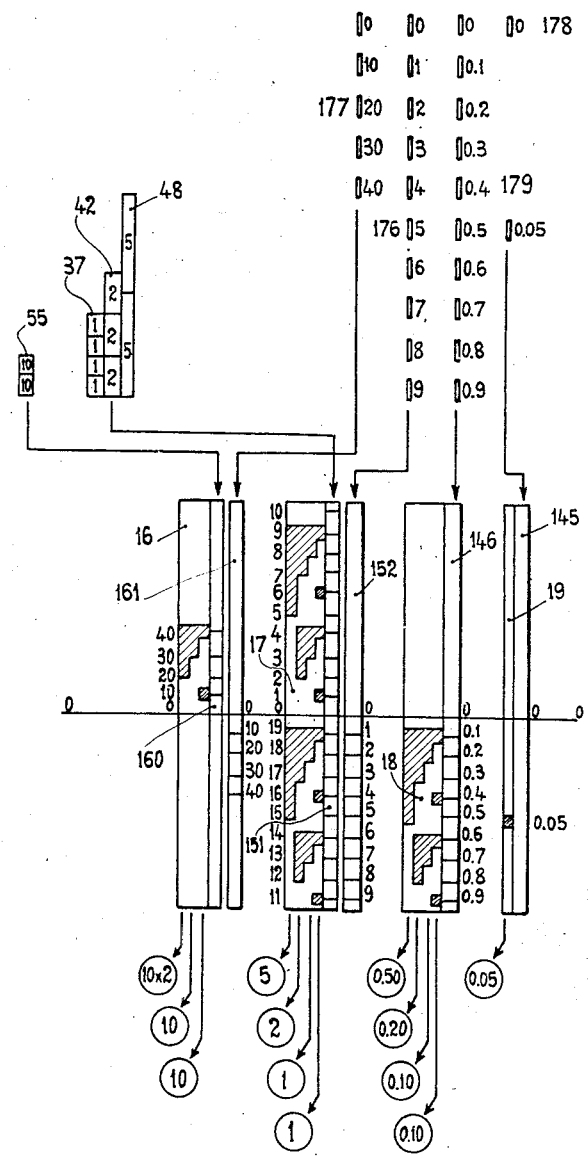
Figure 30 is a diagram of the parts of the differential and change computing device and of its control means actuated by the totalizing device and by setting in members.

The cam 174' of the disk 174 of cam 17 devoted to units ordinal which drives the transfer gear 162—175 operative on cam 16, is arranged in such a manner that when in the operation of the differential mechanism the 0 portion of cam 17 goes beyond the location of 0—0 line in Figure 30 in the direction of collection increase, that is when the digit the amount to be collected shows in units ordinal is over the digit the amount introduced in the machine shows in the same ordinal, the gear 162—175 causes the tens ordinal cam 16 to be shifted through one unitary step in the direction of collection increase to deduct one units from the change in this ordinal which units is devoted to cover the collection and the change or collections and change in the next lower ordinal or in lower ordinals.

The tens cam 16 actuates a coin distributor adapted to distribute two coins of ten units denomination at each of its operations and also two separate distributors each capable of delivering separately a coin of ten units denomination.

Said cam 16 is actuated by the sleeve 104 which is driven by the disk 69 and by the units ordinal shaft 102 of the totalizing device through the cooperation of the respective transfer gear when the disk 47 has caused said shaft 102 to move through an angle larger than nine unitary steps.

The pinion 161 located adjacent pinion 160 which is connected with cam 16 by the described lost motion coupling means 147, 148, 149 is driven by the setting in members devoted to tens ordinal. Said members are indicated diagrammatically by 177 and in an apparatus devised for a maximum setting in item of 40 units as described, it includes only members providing for setting in the digits 1, 2, 3, 4 as described.

In this respect it should be remembered that the machine is contrived to provide for a number of predetermined items which corresponds with the number of selective setting in keys 1 located in the keyboard, said items in turn corresponding with the configuration of said keys. Therefore, the user while being able to manipulate any of the existing keys 1, cannot set the machine for an arbitrary item. Accordingly, while the construction of the machine is per se such as to allow for setting items over 40 (that is up to 49.95) in order to provide for setting in any predetermined item within a certain range, said machine in actual use is provided only with keys adapted to set items lower than or equal to 40 as a maximum, because of course the machine cannot be used in respect of collection items larger than the maximum amount able to be efficiently introduced in the machine such amount being 40 units in the exemplified construction.

Cams 19 and 18 depend merely upon the digits the item to be collected has in respective ordinals and the pinions 145, 146 fast with said cams respectively are driven by setting in means shown diagrammatically by 178, 179, said pinions bringing the respective cams in their position for delivery of a change corresponding with digits of the item being set in. By way of example, when 10, 20 . . . 90 hundredths are to be collected in the ordinal of tenths of one unit, that is of tens of hundredths, and a manipulation has been made to set in said digit in said ordinal, during the machine operation the respective portion of cam 18 as referenced by 0.1 . . . 0.9 in the drawings is carried into register with line 0—0 that is with levers 23, 23' actuating the change distributors, the configuration of cam 18 in said regions being respectively proper to cause the delivery of the corresponding change 9 . . . 1 (tens of hundredths) in the contemplated ordinal.

As shown diagrammatically the cam 18 may actuate selectively one distributor of 0.50 coins, one distributor of 0.20 coins and two distributors of 0.10 coins, any possible combination between 0.1 to 0.9 inclusive being thus provided for.

The cam 174' of disk 174 solid with cam 18 has such a location that when cam 18 is moved off from its zero position the transfer gear 162—175 is made operative to cause the cam 17 pertaining to units ordinal to move forward through one unitary step in the direction of collection increase in order to deduct one unit from the change digit in the units ordinal, such unit being devoted to account for the collection and change in lower ordinal or ordinals.

The cam 19 of hundredths ordinal which is actuated only by the respective setting in means 178 by the intermediary of pinion 145, is able to take two positions only that is a zero position (no collection and no change in the hundredths ordinal), the transfer gear 162—175 located between cam 19 and next higher ordinary cam 18 being then inoperative, and a position for collection of 0.05 item, the cam 19 being then in condition for actuating a distributor of 0.05 coins in respect of the delivery of a 0.05 change. During the angular movement of said cam 19 into the last named position the cam 174' of associate disk 174 makes the transfer gear 162—175 operative in order to shift cam 18 through one unitary step and deduct one unit from change digit in the tenths ordinal to provide for a 0.05 collection and the delivery of a 0.05 change.

As above described the actuation of several transfer gears takes place in sequence starting from the lowest ordinal gear; for such a purpose the several cams 169 operative on the transfer gears of cams 19, 18, 17 of subsequent ordinals are set at proper angles from each other in order to allow for such transfer operations as made necessary in view of transfer operations from lower ordinals.

The operation of the differential mechanism occurs in the cycle of general operation of the machine after the operation of the coin totalizing device and after the item to be collected has been set in by the manipulation of the selected one of keys 1 and the operation of cooperating means as disclosed in my Patent No. 2,082,155 and as shown in Figure 1 and briefly recalled in the present specification.

In the operation, after the item to be collected has been set in and coins have been introduced, the user actuates the crank handle 213. Then the above described operation of main cam shaft 3 with cooperating parts and of the totalizing device brings the cams 16, 17 into their respective positions in which they would cause the delivery of a change equal to the full amount introduced in the machine, that is the change corresponding with no collection. In the timed operation of the machine the pinions 152, 161 are coupled with those 151, 160 of respective cams 17 and 16 and thereafter they rotate through an angle in proportion with the collection to be made that is with the item which has been set in by the manipulation of key 1 and said pinions 152, 161 cause the cams 17, 16 to move back thus bringing them in a position proper for delivery of a change equal to the difference between the amount introduced in the machine and the item to be collected.

By way of example assuming that an amount equal to 38 units has been introduced in the machine, the tens cam 16 will have its portion referenced in Figure 30 by 30 (there tens) in register with line 0—0 in said figure, that is on the line where levers 23, 23' of the change coin distributors cooperating with cams 19—16 are located. In a similar manner the units cam 17 will have its portion referenced 8 (eight units) in register with said line 0—0.

If the machine is operated without a collection item having been set in, an amount equal to that introduced in the totaliser will be refunded to user.

For purposes of illustration, it will be assumed that after the introduction of said coin amount of 38 the machine has been set for collection of an item of 16.75 by the manipulation of a key 1 adapted to produce a proper operation of the above described means actuating the pinions 145, 146, 152, 161, such amount of 16.75 being assumed by way of example to develop in detail the full operation of the machine whilst in actual use the user generally introduces therein an amount immediately or scarcely over the item to be collected.

Then during the machine operation the pinions 160 and 151 of cams 16 and 17 after such cams having been carried in their positions depending upon the digits the amount introduced in the machine includes in respective ordinals, are coupled by the respective coupling pinions 153 (Figure 26) with pinions 161 and 152 and thereafter they are shifted by these pinions 161 and 152 through an angle in proportion with the respective digits of the item to be collected. Accordingly said cams 16 and 17 move back each through such an angle as required to deduct the amount to be cashed into the machine from the amount they are in position to deliver when in their full change position as above described.

Under these conditions, the cam 16 will have its portion 20 instead of portion 30 in register with line 0—0 and in a similar manner the cam 17 will have its portion 2 in register with line 0—0 instead of portion 8. In this operation the cam 174' of disk 174 solid with cam 17 does not operate the lever 171 of the cooperating transfer gear (Figures 23-25) and accordingly such transfer gear is not set in operation.

The cam 18 which at the beginning of the operation of the change distributor is always in the illustrated position, that is with its 0 portion on line 0—0 (it being not actuated by the totalizing device and therefore being in position for no collection and no change delivery in the respective ordinal unless shifted by the item setting means) is carried by the item setting in means and pinion 146 into its position in which its portion referenced 0.7 is in register with line 0—0 to operate for a collection of 0.7 and delivery of a change of 0.3. Therefore said cam 18 on moving from its 0 position carries the transfer gear 162, 175 actuated by its disk 174 in operative position and the subsequent operation of said transfer gear before the actuation of levers 23, 23' brings the higher ordinal cam 17 from its 2-position into its 1-position for the above stated reasons and purposes.

In a similar manner the cam 19 is shifted by item setting in means and pinion 145 into its position in which its 0.05 portion is in register with line 0—0; it is thereby brought in position to deliver a change of 0.05 and by its transfer gear 162—175 it causes the next higher ordinal cam 18 to move forward through one unitary step thus carrying said cam 18 from its position for delivery of a change 0.3 into its position for delivery of 0.2 change.

When this portion of the operation of the machine is completed and before levers 23, 23' intended to actuate the change distributors are operated, the cams 19—16 have thus been brought with such portions thereof in correct positions for cooperation with levers 23, 23' as required to cause amounts 2, 1, 2, 5 to be delivered in respective ordinals, that is a total amount of 21.25 is delivered as a change, which amount is the correct change from 38 less 16.75.

Assuming the amount 38 has been introduced in the machine as in the previous example and the item 16.00 is required to be collected, the cams 18 and 19 are not moved off from their zero-positions. Therefore, the transfer gears 162—175 for transfer from cam 19 unit cam 18 and from cam 18 unto cam 17 are not made operative. The cam 17 is thus left in its 2-position and the correct change of 22 (that is 38 less 16) is delivered.

Should the item 16.05 have to be collected, the cam 19 causes the cam 18 to move forward through one unitary step and cam 18 in turn causes cam 17 to move through one unitary step, the change of 21.95 being thus delivered.

Finally assuming the amount 38 has been introduced and that the amount 19.75 is to be collected, the cam 174' of disk 174 solid with cam 17 actuates the transfer gear 162—175 for transfer unto cam 16 at the time the differential mechanism is actuated, and then a change of 18.25 will be delivered. In these circumstances the cam operation will be the same as above described (apart from the fact that cam 17 takes a different position with respect to previously considered positions in view of the digit for which this cam is set in the present example), but the cam 16 is moved forward through one unitary step in the direction of increase of collection in order to deduct one unit from the change in the tens ordinal such unit being devoted to cover the collection and change in lower ordinals.

The described operation of cams 19—16 is availed of to actuate a mechanism, as hereinafter described (Figures 27 and 28) which disables the coin collecting means, the ticket issuing means and the operation of change distributors when the operator has set in, for collection, an item higher than the amount provided by the coins introduced in the apparatus.

For such a purpose the tens cam 16 is solid with a locking cam 180 capable of permitting or preventing the operation of the change distributors as well as of a mechanism which carries temporarily the coin collecting hopper 32 into its collection-operative position, that is with its outlet 32' in register with duct 90 (said hopper 32 having normally said outlet 32' in register with duct 214 in order to refund the coins inserted in the apparatus to the user as described). Said mechanism also holds the ticket issue guide 33 into its delivery position that is in register with duct 216, and on the contrary it moves said guide 33 temporarily into register with duct 215 leading to a receiver located inside the machine, when the machine has been wrongly manipulated and no ticket is to be issued.

The position of locking cam 180 depends upon the position of all cams 19, 18, 17, 16 of subsequent ordinals because of transfer gears 162—175 associated with respective cams as above described.

When the cams 19, 18, 17, 16 are in their inoperative position as illustrated in Fig. 30, the locking cam 180 holds the above stated mechanism in its hereinafter described positions of operation, and due to the angular extent of two cams 16 and 17, said conditions of operation are maintained in respect of any position of the cam 180 corresponding with the introduction of amounts between 0 and 40 inclusive. On the contrary, when the cam 16 has been shifted by the differential mechanism or by its transfer gear 162—175 and has been carried in a position in which its portion operative for no-change action goes over line 0—0 (Fig. 30) in the direction of increase of collections, said cam 180 is caused to make the coin collecting means and ticket issue means inoperative.

Assuming by way of example that a one-unit coin has been introduced in the machine and that the item 1.10 has been set in by manipulating the correspondingly arranged key 1, in the described operation the cam 18 by its transfer gear 162—175 causes the cam 17 to move back through one unitary step (said cam having firstly taken its position for change of 1 due to the operation of the totalizing mechanism and having then been moved back through one unitary step under the action of the differential mechanism). Therefore, the cam 17 by means of its own transfer gear 162—175 moves the cam 16 which is in its 0 position and the locking cam 180 integral therewith into a position in which said locking cam 180 makes the means actuating the change distributors as well as the coin collecting device and the ticket issue means inoperative.

A similar operation occurs either directly under the action of the differential mechanism or indirectly by the action of the chain of transfer gears 162—175 of subsequent cams, when an item is set in by means of keys 1 for collection which is larger than the amount provided by coins introduced in the machine or also when no coin has been inserted in the machine.

The mechanism controlled by the locking cam 180 (Figures 27 and 28) includes the ticket guide 33. Said guide is pivotally mounted at 189 in the stationary frame 190 of the machine and is controlled by a lever 191 which in turn is controlled by a rocker 198 by the intermediary of a lever 192, 192' fulcrumed at 193, rod 194, levers 195 and 195' fast with shaft 196 and rod 197. The rocker 198 is pivoted at 199 and has noses 198' embracing said cam 180, the positions of rocker 198 and guide 33 thus being dependent upon the angular position of cam 180.

Figure 40:
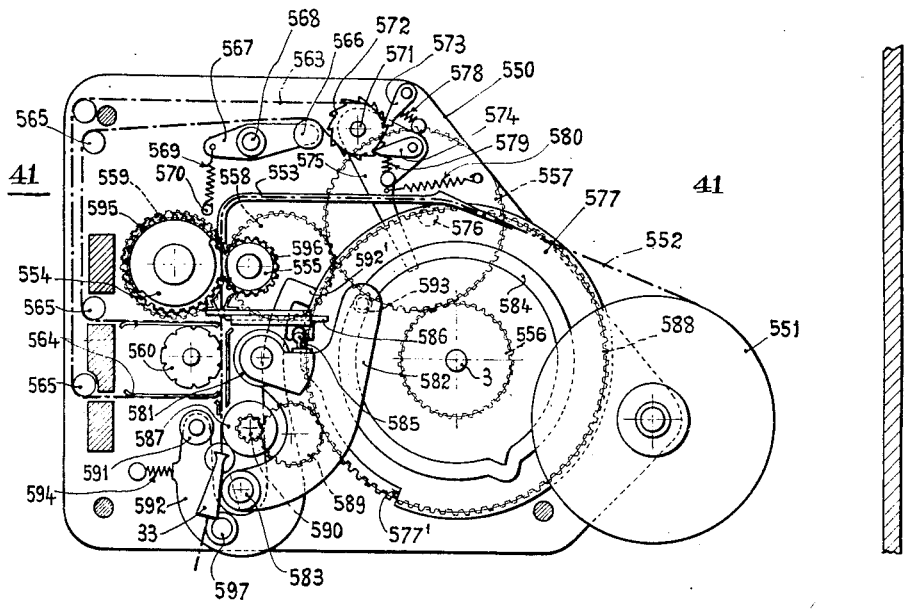
Figure 40 is a diagrammatic front view of the ticket printing and issuing device and Figure 41 is a fragmentary plan view of the same.
Figure 41:
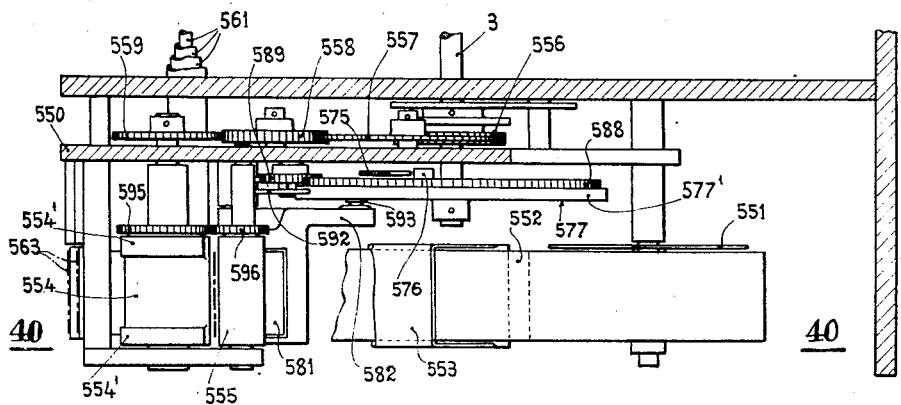

Figures 40 and 41 show by way of example a device for printing and severing a ticket adapted to cooperate with the described machine and with the ticket delivery guide 33.

Said device includes a frame 550 suitably fastened on the general machine frame in which a reel 551 is rotatably supported for supplying a ticket paper ribbon 552 to a gateway 553 leading said paper ribbon between conventional feeding rollers 554, 555. Roller 554 is driven by a gear train 556, 557, 558, 559, 595, 596, and the prime mover pinion 556 is fast on main cam shaft 3. Said roller 554 has side raised portion 554' adapted to engage the paper ribbon and press it against cooperating roller 555 for imparting a feeding motion to said ribbon 552 during a portion of each revolution of roller 554.

Type wheels 560 are arranged adjacent the path of said paper ribbon 552 subsequently to rollers 554, 555, each of said type wheels pertaining to one ordinal and they being actuated by the intermediary of their concentric tubular shafts 561 and pinions 562 by the respective pinions 224 as described. An inking ribbon 563 is arranged to move in front of type wheels 560 by means of guides 564 and rollers 565 said ribbon being tensioned by a roller 566 loose on rocker 567 fulcrumed at 568 and acted on by a spring 569 attached to a stationary stud 570. A feeding motion is imparted to ribbon 563 by a driving roller 571 having ratchet teeth 572 engaged by a return pawl 573 and by a driving pawl 574 mounted on and actuated by an arm 575 which, in turn, is actuated by a crank pin 576 of a cam disk 577 fast on main cam shaft 3. Springs 578, 579, 580 act to restore said pawls 573, 574 and arm 575.

A platen roller 581 is arranged opposite type wheels 560 and is supported by an arm 582 pivoted on a stationary stud 583 and actuated by a pin 593 engaged in a cam groove 584 of disk 577. Said arm 582 also actuates by a finger 585 a sliding blade 586 adapted to sever a ticket from the paper ribbon fed by rollers 554, 555.

Adjacent the path of the ticket after being severed by blade 586 and intermediate platen roller 581 and guide 33, a further feeding roller 587 is located which is driven at a high speed by a gear train 588, 589, 590 whose prime mover 588 is fast on main cam shaft 3.

A roller 591 is loose on an arm 592 pivoted at 593 and acted on by a spring 594 tending to move it with roller 591 against roller 587 and an intermediate ticket. Said arm 592 has a nose 592' cooperating with a spiral and abrupt tooth cam 577' of disk 577 to control the operation of said arm 592 under action of spring 594.

During one revolution of main cam shaft 3 and after the type wheels 560 have been carried into printing position by the manipulation of setting in key 1 and operation of the machine means operating slides 2 and pinions 224, the timed operation of cam groove 584 causes a ticket to be printed on rollers 560 by platen roller 581 and severed by blade 586 and then to be ejected by high speed revolving roller 587 through guide 33 when the cooperation of cam edge 577' permits arm 592 to carry its roller 591 in position to force the ticket into driving engagement with roller 587.

The several parts are then restored in inoperative position when main cam shaft 3 comes to rest when an operation is completed, and the inking ribbon 563 is fed through one step at each revolution of main cam shaft 3.

A rod 200 is pivotally connected with the rocker 198 and it actuates an arm 201 pivoted at 201'' on the arm 22 fast on shaft 89. The shaft 89 in turn has an arm 203 fast thereon and operative on coin collecting hopper 32 by the intermediary of a rod 204 and arm 205 fast with said hopper 32.

The shaft 89 also drives the frame 21, 22 which actuates the levers 23, 23' cooperating with cams 16, 17, 18, 19 for the operation of the change distributors.

The drive for the control of the hopper 32 and the actuation of frame 21, 22 is made by the main cam shaft 3 whose twin cams 27, 27' oscillate an arm 88 loose on shaft 89; the arm 201 has a finger 202 which is in a tangential portion of a slot 206 of arm 88 (the hook 201' of arm 201 then engaging a stud 207 fast on the machine frame) or a radial portion of said slot 206 in accordance with either position imparted to arm 201 by rocker 198.

Therefore, in accordance with the position of cam 180 and rocker 198 and finger 202, the oscillation of the arm 88 caused by twin cam 27, 27' is not or is imparted to the frame 22, 21 and to rod 204 as well as to coin collecting hopper 32.

Also the position of the ticket guide 33 is dependent upon the position of cam 180 and of rocker 198 as described.

The shaft 21 for levers 23, 23' actuating the change distributors is carried by arms 22 as described; accordingly, when the cam 180 makes the machine inoperative, also the levers 23 are made inoperative.

When inoperative the coin hopper 32 has its bottom outlet 32' in register with the duct 214 which opens in the cup 91 freely accessible to the user, while the ticket guide 33 is in register with the duct 216 opening in said cup. When the machine has been correctly operated and the cam 180 is in position for its normal operation, the ticket guide 33 is held in register with duct 216 and parts 22, 89, 203, 204, 205 are in position to operate, at the time the cams 27, 27' drive the arm 88, in such a manner as to cause the coin hopper 32 to be temporarily moved into its position for discharge into the duct 90 as soon as the operation of the totalizing device has been completed and immediately before the coins are to fall thereinto from chambers 55, 37, 42, 48. Thereafter, said mechanism restores the hopper 32 into its position in which its outlet 32' opens into duct 214 and cup 91.

On the contrary, if the manipulations have been incorrectly made (the set in item being larger than the amount formed by coins introduced in the machine) said cam 180 carries the ticket guide 33 into its position in which said guide 33 and cooperating means as described, convey the issued ticket into the duct 215 and the cash collecting receptacle while said cam disables the transmission intermediate the arm 88 and means 22, 89, 203, 204, 205 actuating the hopper 32; then this hopper is left stationary with its outlet 32' in register with the duct 214 opening in the cup 91 and consequently the coins which have been introduced in the machine are refunded to user.

The apparatus is prepared for the service it is devoted to, having in mind the maximum amount of coins the totalizing device is adapted to account for, by inserting appropriate keys as 1 in the selective setting in mechanism to be controlled and actuated by them as described in the previously-mentioned Patent No. 2,082,155 and hereinbefore recited, and the change coin magazines 20 are filled with an appropriate supply of coins. The ticket printing and delivering device is also supplied with a paper ribbon for its described operation.

The use and general operation of the described machine through a complete cycle of operation are hereinafter described in the assumption that the user introduces in the sections of the totalizing device the full number of respective coins they may contain and that the item 16.75 is set in by the manipulation of one of keys 1, it being further assumed that said coins have the denominations "ten", "five", "two" and "one" in respect of chambers 55, 48, 42 and 37, respectively.

The user introduces said coins in any preferred order, each through slot 220 (Fig. 29) and duct as 57, 49, 43 and 38 devoted to respective denominations, said coins thus filling the respective chambers which are in full line positions in Figs. 3 and 4, the coins being shown in dotted lines within said chambers. Should the user introduce a number of coins of any or some or all denominaitons over the capacity of the respective collecting chambers, the excess coins are discharged directly through the gap between each respective duct and cooperating chamber into the hopper 32 and they fall through its outlet 32' and duct 214 (Fig. 29) into cup 91 for refund to user, they being entirely inoperative in the machine.

The selection of introduced coins as required to reject counterfeited or distorted coins is effected by means of known devices shown diagrammatically at 221, such devices directing the rejected coins in a stationary hopper 222 discharging in the hopper 223 which, in turn, leads to the cup 91 for return to the user.

Thereafter, the user shifts the particular key 1 which corresponds with the ticket he wants to obtain. As above described, the manipulation of a key 1 causes fingers 501 to protrude in the path of respective parts 2, 502, 503 in positions to predetermine the strokes of parts 2 and movements of pinions 145, 146, 152, 161, 224 through extents proportional to digits the price of said ticket includes in the several ordinals, that is, to 1, 6, 7 and 5 in tens, units, tenths and hundredths ordinals in the present example.

Then the user actuates the crank handle 213 to drive the main cam shaft 3 and cams fast therewith through a complete revolution. In the event the machine is actuated by an electro-motor, the circuit of such electro-motor may be closed automatically by the manipulated key 1 on the completion of the key setting-in stroke, the machine thus starting to operate after the selected key has been manipulated without any further operation by the user.

In the first portion of the operation, which is carried out by main shaft 3 with cams fast thereon and cooperating parts, as hereinafter referred to in detail, the cams 130 remove the locking noses 127 (Fig. 7) and the cams 4 and 5 (Fig. 19) actuate the quadrant 10 and parts 11, 210, 12, 14 to cause the carriages 14 to effect their rightward stroke (as seen in Fig. 1) in order to zeroize slides 2 which may have been shifted into a setting-in position in a previous operation and have been left in such position. As described, said carriages 14 engage the lugs 502' of pawls 502 of respective slides 2 and cause them to engage their recesses 14' preparatory to the subsequent setting-in operation. At the same time the cams 135, 136 of the main shaft 3 (Fig. 7) operate to complete the zeroizing motion of the sleeve 104 and shaft 102 and of the parts of the differential and change delivery devices cooperating therewith, such zeroizing operation occurring in part at the end of each cycle of operation, preparatorily to a subsequent one.

At the same time the cams 93, 93' (Fig. 17) actuate the arm 94 with quadrants 97 and 98 driving quadrant 99 and pinion 100 fast with sleeve 61 and shaft 92 and consequently the respective arms 60 and 62. Then the described operation of the totalizing device occurs, and the arm 60 by its finger 59 engages coins located in chamber 55 of the tens section of the totalizer (Fig. 4), thus moving said chamber 55 with arm 54 and driving the disk 69 by means of cooperating fingers 71 and 70. The pinion 103 in mesh with teeth 75 of said disk 69 is thus moved through an angle proportional with the amount provided by coins located in chamber 55.

At the same time the pinion 100 and shaft 92 drive the arm 62 (Fig. 3) of the totalizing device section devoted to unit ordinal coins. Said arm 62 engages coins located in chamber 37 by its finger 63 and drives quadrant 34 which, in turn, by finger 46 acts on coins in chamber 42 and moves quadrant 41. Said quadrant 41 by its finger 52 engages coins in chamber 48 and drives disk 47, pinion 101 and shaft 102 through an angle proportional with the amount provided by the coins located in unit ordinal section of the totalizing device.

The brake members 76 (Fig. 6) engage frictionally the parts 54, 34, 41, 47 to restrict them from undue displacement from their respective normal positions (Figs. 3 and 4) under the load of coins introduced in their respective chambers 55, 37, 42, 48, at the time said parts are released by cooperating fingers 73, 64, 65, 66 of respective arms 60 and 62 and until said parts 54, 34, 41, 47 are positively operated by the coin engaging fingers 59, 63, 46, 52 and coins located in their respective chambers, this operation occurring when the arms 60 and 62 are oscillated by their drive for the described operation of their fingers 59 and 63 and of associated parts.

The parts 34, 41, 47, 54, 69 are thus carried into chain line positions in Figs. 3 and 4, the disks 47 and 69 being aligned by aligning gears 79 under the control of cams 84, 85 and associated parts (Fig. 4) and the several parts being held in position by brake members 76 (Fig. 6).

During the above-described operation of the sections of the totalizing device, the cams 118—118' and 119—119' (Figs. 20, 21 and 22) control the coupling and transfer members 111, 112 and 123, 124 firstly to couple pinion 101 with pinion 106 and pinion 108 with 103, while holding the transfer pinions 123, 124 inoperative, thus providing for transmission from disk 47 to shaft 102 and from disk 69 to sleeve 104, then the coupling pinion 112 is removed to release 108 from 103 while transfer pinions 123, 124 are made operative between pinions 107 and 108 for tens transfer from shaft 102 unto sleeve 104, and finally also the coupling pinion 111 and transfer pinions 123, 124 are removed from pinions 101, 106 and pinions 107, 108 to make said parts 61 and 92 independent of parts 102 and 104 as necessary for their subsequent separate movements in the machine operation.

By the described operation, the pinions 151 and 160 fast with shaft 102 and sleeve 104, respectively, are moved each from its zero position through an angle proportional with the amount provided in the respective ordinal by the total value of coins pertaining to various denominations which have been inserted in the respective sections of the totalizing device, and the cams 17 and 16 driven by said pinions 151 and 160, respectively, are carried each in the one of its possible positions in which it has in register with the cooperating lever 23 of the change delivery device a portion thereof which is adapted to pre-set a delivery of change coins to an amount equal to the said amount made up in the concerned ordinal by the total of coins which have been introduced by the user (portions marked 0 and 40 in Fig. 30, respectively, in the above exemplified introduction of an amount "40" by the user).

Then cams 157 of main shaft 3 cause the coupling pinions as 153 (Fig. 26) to couple pinion 160 with pinion 161 and pinion 151 with pinion 152, and thereafter cams 4, 5 actuate the quadrant 10 to drive parts 11, 210, 12 (Fig. 19) and to cause carriages 14 to make their full leftward stroke. Each of said carriages 14 brings the respective slide 2 with it until the pawl 502, 503 of said slide engages the particular finger 501 which has been caused to protrude in its path by the manipulation of the selected key 1. The slides 2 are thus stopped as described after they have moved each through an extent proportional with the digit of the set-in amount in the respective ordinal and has driven through a similar extent the cooperating one of the pinions 145, 146, 152, 161 of the differential device and also the respective pinion 224 for operation of the type wheels 560 of the printing device (Figs. 40 and 41).

The change delivery cams 19 and 18, which are controlled only by the respective slides 2, are thus carried by said slides into position to pre-set the delivery of change in the respective ordinals subject to operation of transfer means, as hereinafter described. The cams 17 and 16 which, as above stated, have been moved by the totalizing device into a position for delivery of a change amount equal to the amount provided by coins introduced and totalized by the totalizing device, are carried back, owing to the coupling of respective pinions 151, 160 with pinions 152, 161 by pinions 153, into a position in which they pre-set the delivery of respective change coins making the difference between the figures of the totalized amount and the figures of the set-in amount in respective ordinals.

In their motion, the cams 19, 18, 17 by the respective cam disks 174, 174' pre-set the operation of the inter-cam transfer gears 171, 162, 170 (Figs. 23, 24, 25), such transfer gears being thereafter made operative in succession in cooperation with flexible coupling means 147, 148, 149 of said cams by the respective cams 169, 169', 169" and cooperating means after said cams 19, 18, 17, 16 have reached their respective positions depending upon the totalized and set-in amounts to bring each cam 18, 17, 16 in a position accounting for the change delivery produced by the respective lower ordinal cam, such cams being thus finally carried in an angular position with respect to cooperating levers 23 to pre-set the delivery of a change of 23.25, in the manner described in detail in respect of the organization and operation of the differential device.

As a result of the above-described operation, the several change delivery cams 16, 17, 18, 19 are in their proper position for causing the delivery of correct change between the totalized amount and set-in amount, and the control member 180 dependent upon the chain of inter-cam transfer gears 171, 162, 170 is in position for controlling the operation of change and ticket delivery means.

The machine having been correctly operated in that in the exemplified conditions the set-in amount to be cashed is less than the amount introduced in the totalizing device, said control member 180 is in a position in which it holds rocker 198 in one of its positions by which the parts 197, 195, 194, 192, 191 hold the ticket delivery guide 33 in position to direct the ticket to be delivered into duct 216 and cup 91.

Figure 27:
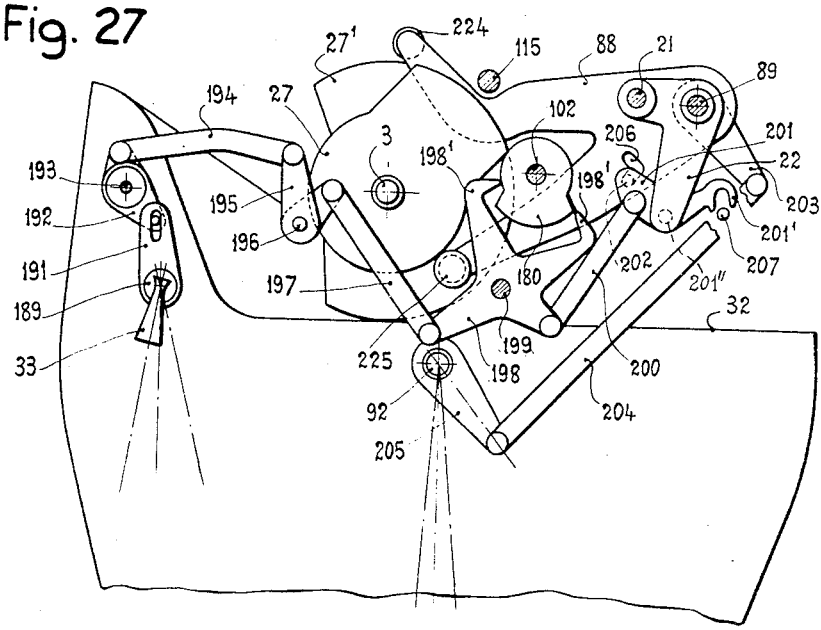
Figure 27 illustrates separately the tendered coin collecting device with its actuating means and with means for actuating the ticket and change coin delivering device.
Figure 28:
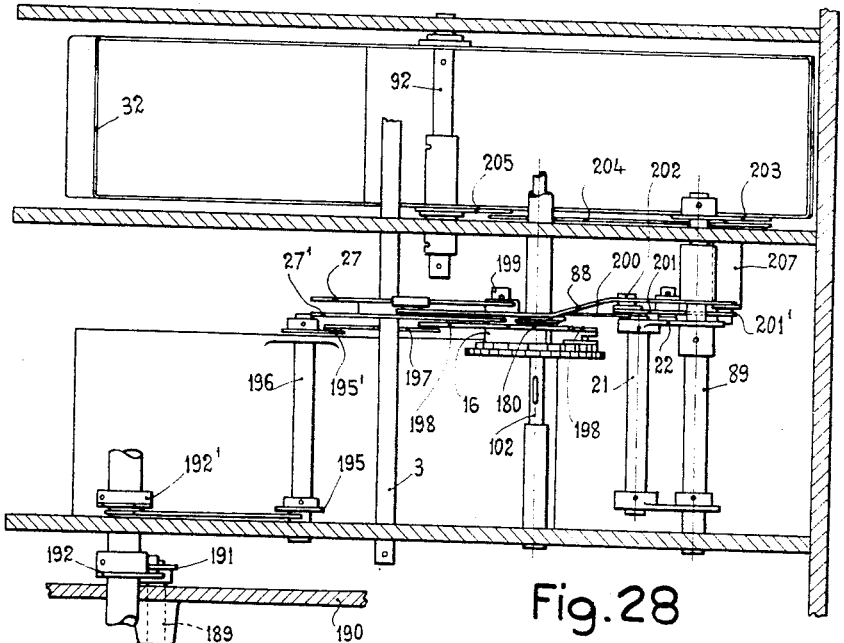
Figure 28 is a plan view of Figure 27 the parts being assumed to be located within the machine frame which is shown in section.
Figure 29:
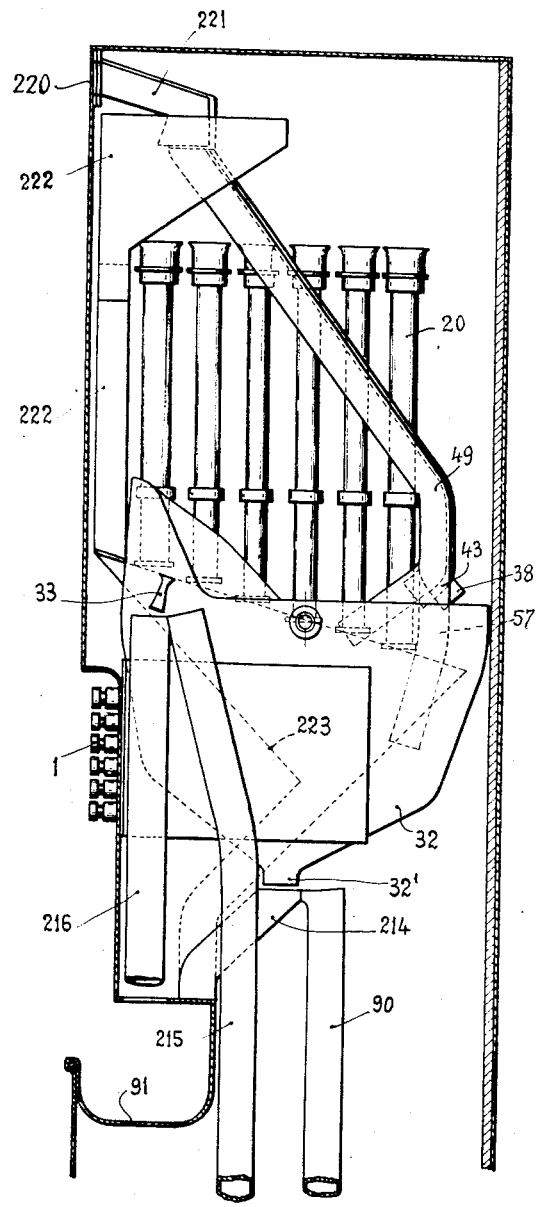
Figure 29 illustrates to a reduced scale the arrangement of the several ducts conveying the tendered coins, tendered coin collecting means, ticket distributor, change coin distributor, and means connecting said distributors with a cup for delivery of coins and ticket to user.

Similarly, the rod 200 controlled by said rocker 198 and the arm 201 pivoted on arm 22 hold the hook 201" released from stationary pin 207 and the coupling finger 202 in the radial portion of the slot 206 of the arm 88 (as shown in Fig. 27). Therefore, on cams 27, 27' of main shaft 3 becoming operative on said arm 88, this arm 88 drives the arms 22 carrying the spindle 21 and fast with shaft 89 and levers 23 are caused to cooperate with the respective cams 16, 17, 18, 19 to actuate the change coin delivery means 24, 25, 25', 29, 30, 31 for delivery of change coin from magazines 20 into stationary hopper 223 and cup 91 (Figs. 1, 2, 29).

The actuation of arm 22 and shaft 89 by arm 88 and cams 27, 27' oscillates the hopper 32 by means of arm 203 fast with shaft 89, rod 204 and arm 205 to temporarily bring its outlet 32' in register with duct 90 leading to a cash collecting receptacle.

At this time the ticket printing device (Figs. 40, 41) is made operative by the cam groove 584 to print, sever and deliver under the action of ejecting roller 587 a ticket through guide 33. Further, the cams as 84, 84', 85 (Fig. 4) release aligning members 79, 79' from disks 69 and 47', and the cams 93, 93' and quadrants 97, 98 (Fig. 17) cause the return oscillation of arms 60 and 62 by means of cooperating parts 99, 61 and 100, 92, respectively. Said arms 60, 62 in their own return oscillation and in the similar oscillation of the quadrants 34 and 41 produced by said arm 62 by its fingers 64 and 65, cause the fingers 69 and 63, 49 and 52 to release the coins located in the chambers 55, 37, 42, 48, such coins falling into the hopper 32 at the time it is oscillated to have its outlet 32' in register with passage 90, and being thus directed into the cash-in receptacle.

Then the return motion of quadrants 54, 34, 41 and disks 69 and 47 into the full line positions in Figs. 3 and 4 is completed by said arms 60, 62 and fingers 73, 74 and 64, 65, 66, respectively, and finally the zeroizing quadrant 131 with parts actuated thereby and the locking members 128, 130 are made operative, thus completing a cycle of operation.

Should the user defectively manipulate the machine by inserting coins to an amount less than the amount he sets-in by manipulating a key 1, the general operation is the same as above described, but at the end of the operation of the differential device 19, 18, 152, 151, 17, 161, 160, 16 and of the inter-cam transfer gears 174, 171, 162, 170 the control member 180, under the action of said cams 19, 18, 17, 16 and cooperating chain of inter-cam transfer gears, takes a position by which rocker 198 and cooperating parts cause the ticket delivery guide 33 to open into duct 215 for its passage into the cash collecting receptacle (Fig. 29) and the coupling finger 202 to lie in the tangential portion of slot 206 of arm 88. Then, at the time the ticket printing device ejecting roller 587 and the cams 27, 27' are operative, the issued ticket is directed into cash collecting receptacle for recovery by authorized staff, while parts 88, 22, 21 are left stationary and accordingly the levers 23 actuating the change distributor are not actuated, and finally the hopper 32 is left with its outlet 32' in register with duct 214 for refunding the user his coins when they are discharged from chambers 55, 37, 42, 48 of the totalizing device, as above described.

Figures 31-34 illustrate an embodiment of the hereinbefore described totalizing device organised for operation in constructions in which it is not possible or expedient to locate all the chambers of the totalizing device pertaining to the same ordinal on a single shaft, and to actuate all said chambers by means of a single arm. The modification of this invention to be hereinafter described may be of advantage when the totalizing device is to be organized for a comparatively large collection in a monetary system which does not comprise coins of denominations over five units.

In such conditions the totalizing device includes a number of sections, say two, whose driven members are operative on one and the same shaft 335 which drives the units cams (as 17) of the differential mechanism this shaft further driving the tens cam (as 16) of the differential mechanism by the intermediary of a tens transfer gear.

In the illustrated construction the first section of the totalizing device (Figure 31) includes a quadrant 34 having an arc-shaped chamber 37 adapted to receive four one-unit denomination coins from duct 38 and a quadrant 41 having an arc-shaped chamber 42 adapted to receive three coins of two-units denomination. The actuation is carried out by means of an arm 62 fast on shaft 92 and having a finger 63 arranged to move in slot 40 of chamber 37, and by a further finger 46 fast on quadrant 34 this finger being arranged to move in a slot 45 of chamber 42. The quadrant 41 drives a toothed disk 347 by means of its finger 336 this finger engaging after a certain lost motion a finger 337 of disk 347 in the manner and for the purposes described in connection with equivalent members of the section of the totalizing device illustrated in Figure 4.

The said quadrants are restored in their position by fingers 64, 65, 66 of arm 62. 76 illustrates a brake device of the class described in connection with Figure 6 while 79 is an aligning nose mounted on shaft 80 and adapted to cooperate with notches 347' of disk 347, said nose being actuated by a mechanism similar to that 81, 86, 87, 84, 85, 84', 3 as hereinbefore described.

The second section of the totalizing device (Figure 32) is arranged to receive four five-units denomination coins in its arc-shaped chamber 55, said coins being fed thereinto from duct 57. Said chamber 55 has an arc-shaped slot 58 through which the finger 59 of arm 60 is arranged to move. The quadrant 54 carrying the chamber 55 drives a disk 369 by means of respective fingers 338 and 339 arranged to cooperate with lost motion. Fingers 73 and 74 of arm 60 are intended to carry out the return stroke of cooperating parts.

The braking device 76 and aligning device 79 cooperating with this section of the totalizing device are similar to those described hereinbefore.

The actuation of arm 62 solid with shaft 92 and pinion 100 as well as of arm 60 solid with sleeve 61 and quadrant 99, said sleeve 61 being loose on shaft 92, is carried out by toothed quadrants 98 and 97 geared with pinion 100 and quadrant 99 respectively and operating in the same manner as described in connection with Figures 17 and 18.

A shaft 335 is located parallel to shaft 92 and a pinion 340 is fast thereon, said pinion 340 being located between two pinions 341 and 342 identical therewith and loose on the hub of pinion 340 and on shaft 335 respectively. Pinion 341 is in mesh with the teeth of disk 347 while pinion 342 is fast with pinion 343 which in turn meshes with teeth 375 of disk 369.

A coupling pinion 344 is arranged to cooperate with the two pinions 340, 341, the pinion 344 being idly pivoted on an arm 345 mounted and driven in the manner described in respect to arm 154 in Figure 26. A further coupling pinion 348 cooperates with pinions 340, 342 and is idly mounted on arm 346. The cams actuating the arms 345, 346 carrying pinions 344, 38, said cams being not shown in Figures 32–35 but being similar to cam 157 of Figure 26, have a configuration and an angular respective setting causing the pinion 344 to be removed from pinions 340, 341 and pinion 348 in mesh with pinions 340, 342 to intercouple them at the beginning of the operation of arms 62 and 60 uuring the lost motion provided for intermediate fingers 336 and 337 of quadrant 41 and disk 347 and intermediate fingers 63 and 46 and coins the last named fingers cooperate with. After the operative portion of quadrant 97 has completed the actuation of quadrant 99 of sleeve 61 and respective arm 60, the pinion 348 uncouples pinions 340, 342 while pinion 344 couples the said pinions 340, 341.

Therefore during the operation of the totalizing device the shaft 335 is firstly moved through an angle in proportion to the denomination and number of coins introduced in the chamber 55 of quadrant 54, and then it receives a further displacement in proportion to the denomination and number of coins introduced in chambers 37 and 42 of quadrants 34, 41. Said displacements add with each other and the angular motion of shaft 335 is accordingly proportional to the total amount introduced in the machine.

The provision of pinion 343 which is driven by the disk 369 and imparts motion to pinion 342, enables a transmission ratio to be provided between disk 369 and shaft 335 such that the shaft 335 receives from disk 369 angular displacements which are homogeneous, in respect to the amount they correspond to, with the displacements said shaft receives from disk 347. At the same time the mean radius of chamber 55 of quadrant 54 may have an extent enabling it to receive the desired number of coins and, generally, the most appropriate extent on account of structural arrangement of the section of the totalizing device now under consideration.

Figure 5:
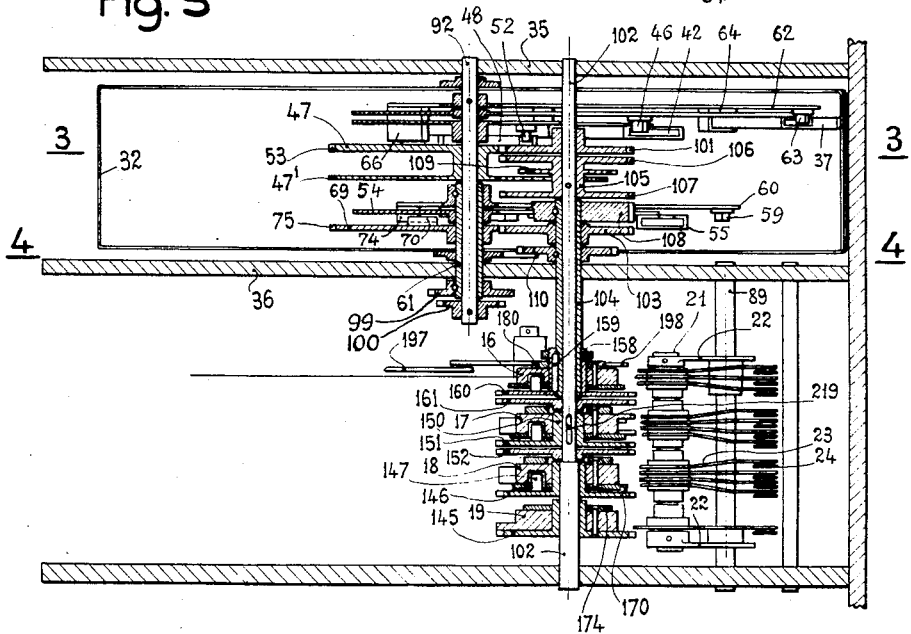
Figure 5 is a section on line 5—5 of Fig. 3.

The driven shaft 335 of the totalizing device which receives a displacement proportional to the amount introduced in the machine drives a cam (not shown) similar to that 17 of Fig. 5 and devoted to units ordinal while the displacements of said shaft over nine unitary steps are transferred from said shaft unto the sleeve 349 which controls a cam (not shown) devoted to tens ordinal and equivalent to cam 16 of Figure 5.

For such a purpose a pinion 350 is fast on shaft 335 and said pinion actuates an adjacent pinion 351 solid with sleeve 349 in such a ratio that pinion 351 is moved through one step every ten motion steps (180° in the illustrated construction) of pinion 350. The said actuation is made by the intermediary of a Geneva-cross pinion 352 and a pinion 353 integral therewith. The gear 352, 353 is idle on an arm 354 loose on shaft 115 and actuated by a cam 119. The cam 119 moves the pinions 352, 353 into engagement with pinions 350, 351, at the beginning of the operation of the totalizing device and removes said pinions 352, 353 from pinions 350, 351 when said operation is completed in order to enable the differential mechanism to properly operate.

Pinions 109 fast with pinions 350, 351 are in mesh with pinion 139 intended to restore them into inoperative position as described in connection with Figures 7 and 8.

The operation of this embodiment of the totalizing device of this invention occurs on equivalent lines as described in connection with first named embodiment, the other gears and devices being identical with hereinbefore described ones and operating in the same manner and for the same purpose.

The embodiment illustrated in Figures 35—39 is similar to that described in connection with Figures 1–29, but it is adapted for direct delivery of articles in return of the collection of an amount exactly equal to the predetermined cost of the same. Consequently, this embodiment does not include change distributors while it is organised in a manner to disable means for delivery of articles and to refund the coins introduced in the machine when the amount provided by such coins is different (over or under) the cost of the contemplated article.

This construction includes a key operated setting in mechanism of the hereinbefore described class by means of which the operator may set the machine in operative conditions as required for the delivery of a selected article, but it does not include setting means in respect of ordinals lower than the ordinal of the lowest denomination for which the machine is designed. The machine also includes a totalizing device of the type described in conection with Figures 3, 4, 5 and 10–18, and a hereinafter described differential mechanism which compares the amount introduced in the machine with the cost of the article to be delivered, such cost being set in by the manipulation of the corresponding key 1 in the machine keyboard. On the contrary, cams 16, 17, 18, 19 devoted to compute and deliver the change are omitted.

In Figures 35–39 the parts equivalent to those described in connection with the first illustrated construction and operating in similar manner are referenced by the same reference characters as adopted in connection with first embodiment of this invention.

In respect of each class of articles to be delivered the machine comprises a magazine 300 and an ejector shown diagrammatically by 301; said ejector is actuated by a lever 302 loose on a shaft 303 which is pivotally mounted in the machine frame and has an arm 304 fast thereon. Said arm 304 is connected by a rod 305 with an arm 332 fast on a shaft 89 operative in the same manner and for the same purposes as described in connection with the equivalent and similarly referenced shaft described in connection with Figures 1–30 said operation and purposes being hereinafter recalled.

The shaft 303 is intended to actuate the ejectors 301 of a series of magazines 300 located adjacent each other (Figure 36) and by the intermediary of an arm 306 rod 307 and arm 308 it imparts to a shaft 303' the drive it receives from arm 304 and rod 305; said shaft 303' is mounted in a manner similar to shaft 303 and actuates the ejectors of a second series of magazines.

An arm 309 is fast on shaft 303 and has a slot comprising a radial portion 310 and a tangential portion 310'; a finger 311 engaging said slot is fast on one end of a lever 312 whose opposite arm end provides a hook 312' adapted to engage a stud 314 fast on a stationary part of the machine.

The lever 312, 312' is pivoted at 313 on lever 302 and is controlled by the stem 1' of a key 1 of the machine keyboard by the intermediary of rod 315, lever 316, shaft 376 and lever 377 acted on by a return spring 317.

Figure 35:
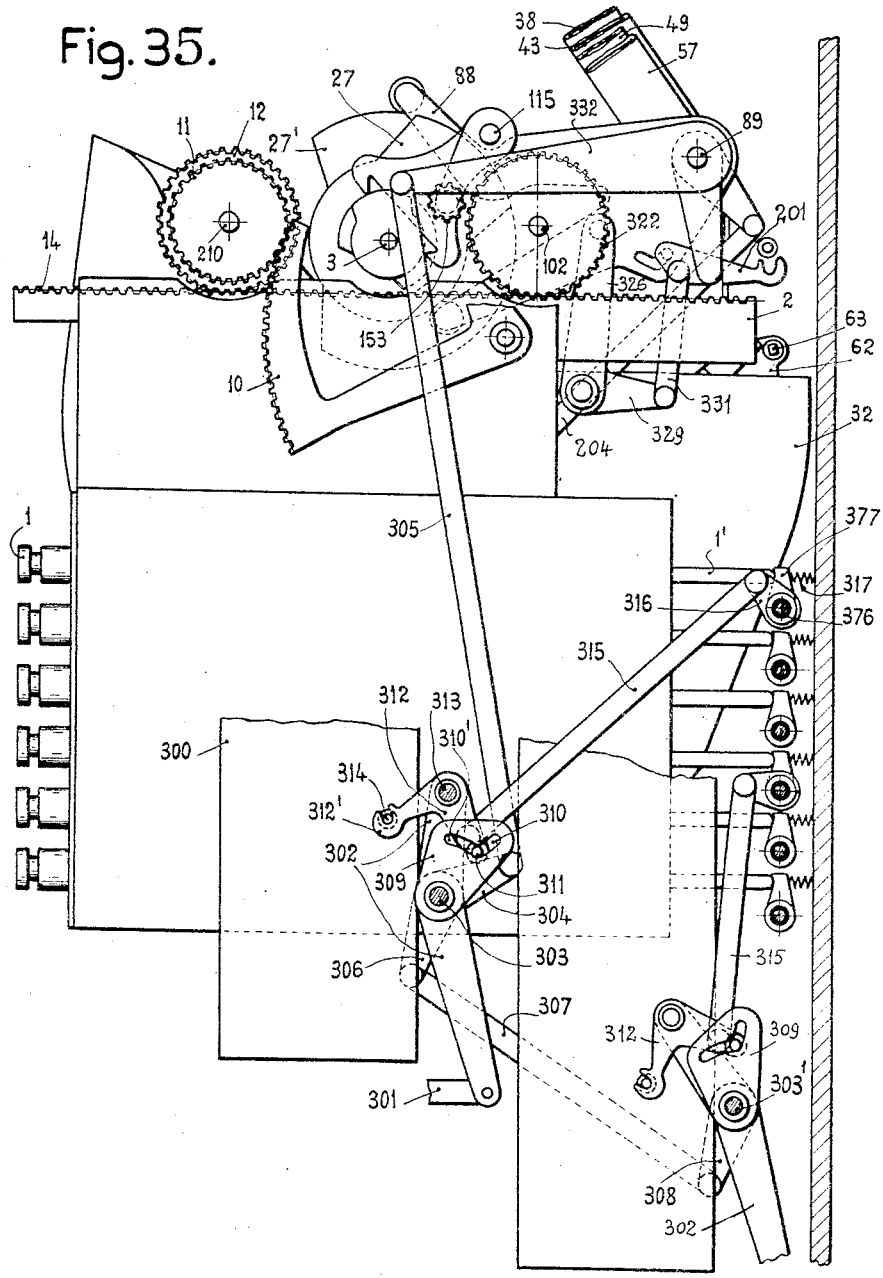
Figure 35 is an elevation of a machine intended for distribution of articles having a predetermined value upon introduction of the corresponding amount and without delivery of rest, some parts being in section on line 35—35 of Figure 36.
Figure 36:
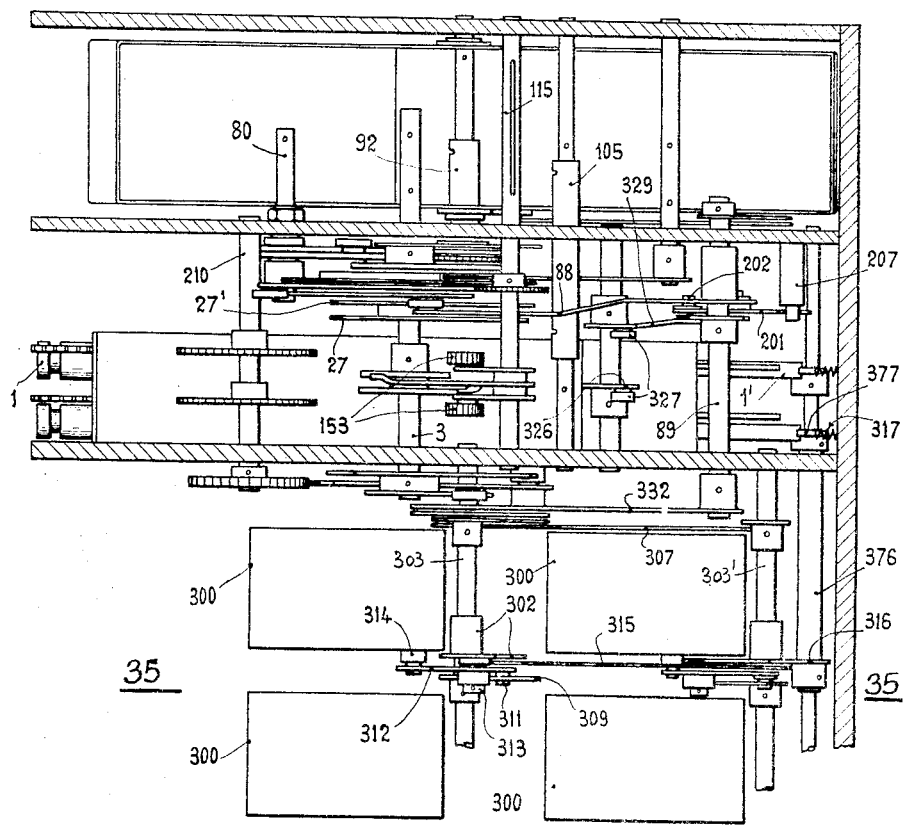
Figure 36 is a plan view of Figure 35 with parts in section.

An arrangement of the described kind is provided in respect of each magazine 300, as shown in Figures 35 and 36. The shafts 303, 303' actuating the several series of magazine ejectors are interconnected in the described manner by arms 304 and 308 and by rod 307, the stroke of rod 305 thus actuating shafts 303, 303' and arms 309 at each stroke. On the contrary the drive for actuation of the cooperating ejector 301 occurs only in respect of the one of levers 302 whose finger 311 has been carried into the radial portion 310 of slot, 310, 310' of the cooperating arm 309 by the manipulation of respective key 1, 1'.

Figure 38:
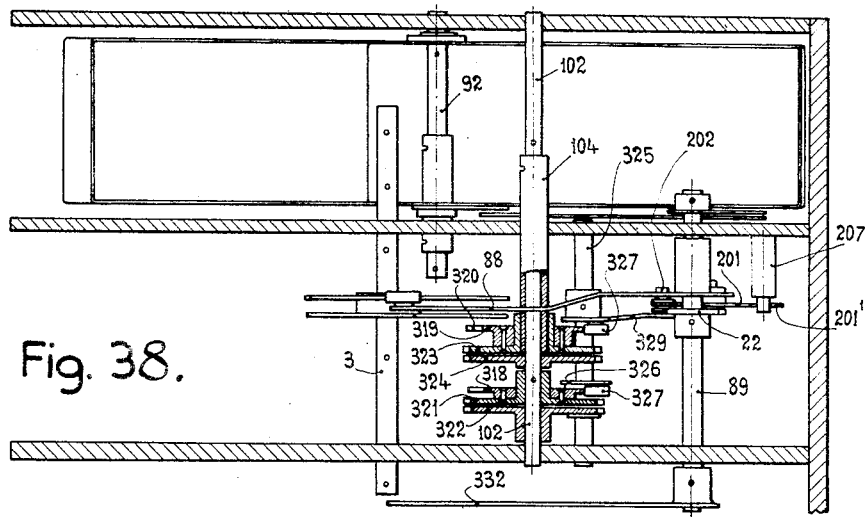
Figure 38 is a plan view with a portion in section on line 38—38 of Figure 37.
Figure 37:
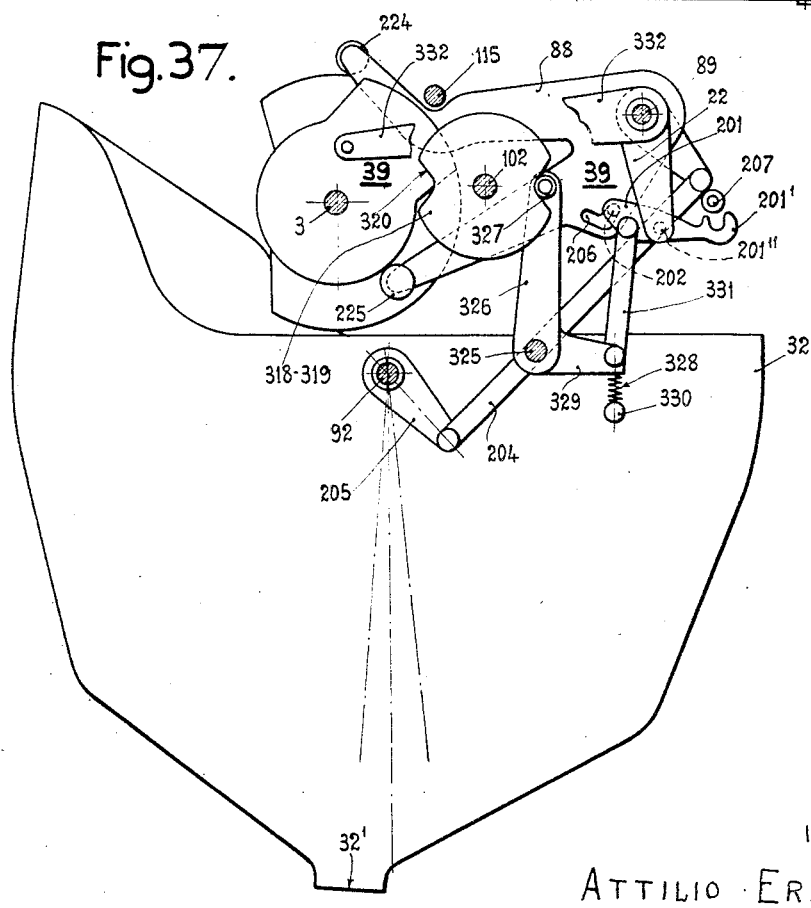
Figure 37 is an elevation of the coin collecting device with its control means and means controlling the delivery of articles.

The totalizing device is identical with that described in connection with Figures 3–18, and in Figures 35 and 38 only the parts of such device which are different in these figures are illustrated and referenced.

The shaft 102 and sleeve 104 (Figure 38) providing the driven members of the totalizing device (which includes a transfer gear which transfers on sleeve 104 the tens of units provided for by units-ordinal coins introduced in the respective section of the totalizing device) have cams 318 and 319 fast thereon respectively. Said cams 318 and 319 have the configurations illustrated in Figure 37, that is each of them includes a cylindrical rim provided with diametrically opposite recesses 320 which are two in number in view of the above stated reasons by which each half revolution of said cams corresponds with ten units of the respective ordinal and consequently identical conditions of operation must be obtained by the two 180° spaced angular positions of said cams.

The cam 318 devoted to units ordinal is fast with a coupling pinion 321 having a setting in pinion 322 adjacent thereto. The pinion 322 is coupled at requisite time with pinion 321 by means of an idle pinion and by an arrangement similar to that described in connection with parts 153, 154, 156, 157 in Figure 26.

The cam 319 of the ten ordinals is solid with a coupling pinion 323 having a setting in pinion 324 adjacent thereto; a coupling device 153, 154, 156, 157 of the described type cooperates with said pinions 323, 324.

A shaft 325 is arranged parallel to shaft 102 and has two arms 326 fast thereon said arms having idle rollers 327 which cooperate with rims of respective cams 318, 319 under the action of a spring 328 operative on arm 329 extending from shaft 325 and on a stud 330 fast in the machine frame. The arm 329 controls by the intermediary of rod 331, the lever 201 whose hook 201' is adapted to engage a stationary stud 207 while the finger 202 of lever 201 enters an angular slot 206 of arm 88 whose rollers 224, 225 are actuated by cams 27, 27' solid with main shaft 3.

The lever 201 is pivoted at 201'' on arm 22 fast on shaft 89 having fast thereon an arm 203 which by means of a rod 204 actuates an arm 205 fast with the coin collecting hopper 32 as well as arm 332 actuating the rod 305 and consequently the shafts 303, 303' which in turn actuate the ejectors 301 of the article delivering magazines.

The inoperative positions of the machine are illustrated in Figures 35–39. All ejectors 301 are then released in register with levers 312 and the possible revolution of shaft 3 by means of its actuating crank handle (not shown but similar to that 213 of Figure 2) cannot carry out the delivery of articles.

When the user has introduced coins in the apparatus and manipulated the particular key 1 setting the machine for operation preparatory to delivery of the article to be obtained and finally has actuated the shaft 3 as above described, the operation of the totalizing device is firstly carried out as described in connection with Figures 3–18. Consequently the cams 318, 319 take up positions respectively corresponding to digits the amounts provided by coins operative in the totalizing device shows in respective ordinals, the recesses 320 being thus moved off through a certain angular extent from rollers 327 which are then engaged by the underlying cylindrical rims of cams 318, 319. Accordingly, shaft 325 and arm 329 oscillate and carry the lever 201 to a position in which its finger 202 is located in the tangential portion of slot 206, the arm 22 and shaft 89 being thus released from arm 88.

Both arms 326 carrying rollers 327 are fast on shaft 325 and therefore the displacement of either of cams 318, 319 is sufficient to produce the described operation.

At the same time the actuation of one of keys 1 has caused the lever 312 to make the lever 302 of the ejector 301 of the magazine of the selected article fast with arm 309 and shaft 303 or 303' respectively.

Thereafter pinions 321 and 322 and pinions 323, 324 are coupled by respective coupling pinions 153 and cooperating means hereinbefore described; accordingly, when pinions 322, 324 move through the angle corresponding with the manipulation of selected key 1, the cams 318, 319 move with pinions 322, 324 through the same angle said pinions are moved and in a reverse direction with respect to the direction they have been moved under the action of the totalizing device.

Consequently, when the motion of pinions 322, 324 as produced by the manipulation of the setting in key 1 is completed, if the amount provided by coins caused to be operative in the machine is correct, that is it exactly corresponds with the set in item, cams 318, 319 have again their recesses 320 in register with rollers 327. Then said rollers 327 enter said recesses under the action of spring 328 and by the intermediary of arms 326, shaft 325, arm 329, rod 331, lever 201 and finger 202 they connect arm 22 with arm 88 driven by cams 27, 27'.

In the final portion of the operation of the machine when arm 88 is oscillated by cams 27, 27', the ejector 301 of the selected magazine is operated and the article is delivered while the coin collecting hopper 32 is carried into its cash position.

On the contrary, should the amount introduced in the machine not exactly correspond with the item involved by the manipulated key 1 and exceeds or is short with respect to it, at least one of cams 318, 319 in the operation of the differential mechanism does not carry its respective recess 320 in register with cooperating roller 327 and this roller is still restricted from motion by the cylindrical rim of the cooperating cam 318, 319. Then the shaft 325 on which the arms 326 carrying rollers 327 are fast, is prevented from oscillating counterclockwise and engagement of arm 22 with arm 88 as well as the delivery of an article cannot take place; further the coin collecting hopper 32 does not take its cash in position and the coins falling down from the totalizing device into said hopper are refunded to the user.

A device of the type described in connection with Figures 7, 8 and 9 restores the cams 318, 319 in their inoperative position should the apparatus not operate.

Figure 39:
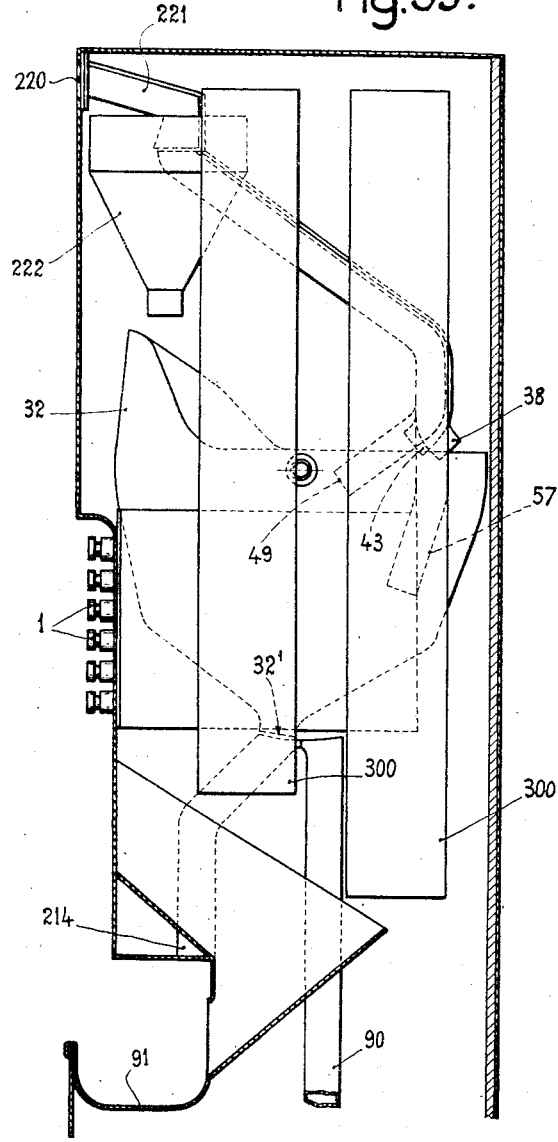
Figure 39 shows to a reduced scale the arrangement of the ducts conveying coins introduced in the machine and collecting means therefor with respect to the delivery cup.

Figure 39 shows diagrammatically the arrangement of devices for selection and possible refund of coins, the collecting hopper 32 and the cup 91 where the refund or rejected coins and the delivered articles are discharged, said parts being referenced in the same manner as in Figures 29 and 30.

The embodiment of Figures 35-39 may be organised for delivering tickets which are provided with printed matters thereon previously to their introduction in the machine; thus a machine is built which is adapted for delivery of tickets without change delivery and is able to operate only when the amount provided by coins introduced by the user and operative in the machine, is equal to the item for which the machine has been set by the manipulation of the key corresponding with the selected ticket to be obtained.

Of course this invention includes all modifications and constructions lying within the spirit of appended claims.

I claim:

1. An automatic apparatus for vending articles such as tickets and other objects having different prices, comprising a movable receiver able to receive a number of coins of a given denomination of a tendered amount, a mover adapted to enter said receiver for engaging coins located therein and shifting said receiver through an extent dependent upon coins therein, means for operating said mover, movable means driven by said receiver through an extent proportional with the tendered amount provided by coins in said receiver, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount receiver driven movable means and said price amount movable means, said coupling means being operative during the displacement of one of said movable means, means for delivering an article, control means for said article delivering means, means for selectively cashing-in and refunding coins located in said receiver, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

2. An automatic apparatus for vending articles such as tickets and other objects having different prices, comprising a movable receiver able to receive a number of coins of a given denomination, a mover adapted to enter said receiver for engaging coins located therein and shifting said receiver, a second receiver on said mover and able to receive a number of coins of another denomination pertaining to the same ordinal as the first-named receiver, a second mover adapted to enter said second-named receiver for engaging coins located therein and shifting said second receiver and for actuating said first-named mover and receiver, means for operating said second-named mover, said operating means, second-named mover, second-named receiver, first-named mover, first-named receiver and coins located in said receivers cooperating to cause said first-named receiver to be shifted through an extent dependent upon respective coins in said receivers, movable means driven by said first receiver through an extent proportional with an amount tendered consisting of the sum of amounts of coins in said first and second receivers, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount first receiver driven movable means and said price amount movable means, said coupling means being operative during the displacement of one of said movable means, means for delivering an article, control means for said article delivering means, means for selectively cashing-in and refunding coins located in said receivers, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

3. An automatic apparatus for vending articles such as tickets and other objects having different prices, comprising a movable receiver able to receive a number of coins of a given denomination, a mover adapted to enter said receiver for engaging coins located therein and shifting said receiver, a second receiver on said mover and able to receive a number of coins of another denomination pertaining to the same ordinal as the first-named receiver, a second mover adapted to enter said second-named receiver for engaging coins located therein and shifting said second receiver and for actuating said first-named mover and receiver, a third receiver on said second-named mover and able to receive a number of coins of a further other denomination and pertaining to the same ordinal as first and second-named receivers, a prime mover adapted to enter said third-named receiver for engaging coins located therein and shifting said third receiver and for actuating said first and second-named movers and receivers, means for actuating said prime mover through a predetermined invariable stroke at each operation of said apparatus, said prime mover actuating means, prime mover, third-named receiver, second-named mover, second-named receiver, first-named mover, first-named receiver and coins located in said receivers cooperating to cause said first-named receiver to be shifted through an extent dependent upon respective coins in said receivers, movable means driven by said first receiver through an extent proportional with an amount tendered consisting of the sum of amounts formed by coins in said first, second and third receivers, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount first receiver driven movable means and said price amount movable means, said coupling means being operative during the displacement of one of said movable means, means for delivering an article, control means for said article delivering means, means for selectively cashing-in and refunding coins located in said receivers, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

4. An automatic apparatus for vending articles such as tickets and other objects having different prices, comprising a loose oscillatable quadrant, a quadrant-shaped chamber on said quadrant able to receive a number of coins of a given denomination of a tendered amount and having an arc-shaped slot in one of its walls, a mover member mounted to oscillate concentric with said quadrant, a finger on said mover member adapted to move through said arc-shaped slot and engage coins located in said quadrant-shaped chamber and quadrant for shifting said quadrant through an extent dependent upon coins in said chamber thereof and in proportion with the tendered amount, means for actuating said mover member through a predetermined invariable stroke at each operation of said apparatus, movable means driven by said quadrant through an extent proportional with the said tendered amount, setting-in means for setting-in amounts of the price of the articles to be vended, price amount movable means adapted to move through extents proportional with said amounts, means under the control of said setting-in means to drive said price amount movable means through an extent proportional with the price amount set in at each operation, means for coupling said tendered amount quadrant driven movable means and said price amount movable means, said coupling means being operative during the displacement of one of said movable means, means for delivering an article, control means for said article delivering means, means for selectively cashing-in and refunding coins located in said quadrant-shaped chamber, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

5. An automatic apparatus for vending articles such as tickets and other objects having different prices, comprising a movable receiver able to receive a number of coins of a denomination pertaining to one ordinal, a mover adapted to enter said receiver for engaging coins located therein and shifting said receiver through an extent in proportion with such coins therein, a second receiver able to receive a number of coins of a denomination pertaining to another ordinal, a second mover adapted to enter said second receiver for engaging coins located therein and shifting said second receiver through an extent in proportion with such coins therein, means driven by said first receiver through an extent proportional with the amount formed by coins therein, means driven by said second receiver through an extent proportional with the amount formed by coins therein, a transfer gear intermediate said first receiver driven means and second receiver driven means, said driven means including movable members each moved through a space including an extent proportional with the digit the tendered amount provided by coins introduced in said first and second receivers includes in the respective ordinal, means for actuating said movers each through an invariable stroke at each operation of said apparatus, setting-in means for setting-in amounts of the prices of the articles to be vended, price amount movable parts each adapted to move through extents in proportion with the digits the price amounts include in the several ordinals, means under the control of said setting-in means to drive said price amount movable parts each through an extent proportional with the digit the price amount set in at each operation has in the respective ordinal, means for intercoupling said tendered amount receiver driven movable member and said price amount movable part of each separate ordinal in a pair, said intercoupling means being operative during the displacement of one of said intercoupled movable member and part of each pair, means for delivering an article, control means for said article delivering means, means for selectively cashing-in and refunding coins located in said receivers, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said pairs of intercoupled movable members and parts in the joint operation thereof.

6. An automatic apparatus for vending articles such as tickets and other objects having different prices, comprising a number of oscillatable quadrant-shaped receivers each adapted to receive a number of coins of a given denomination, such denominations pertaining to a given ordinal, said quadrant-shaped receivers having each a mean radius in a ratio with the size and denomination of respective coins it is devoted to, each of said ratios giving an equal angle in all said quadrant-shaped receivers in respect of "unit" value of respective coins, a prime mover adapted to enter a first one of said receivers for engaging coins located therein and shifting said receiver through an angular extent inclusive of an angle in proportion with the number of coins therein, means for actuating said prime mover through an invariable angle at each operation of the apparatus, a mover on each of said receivers with the exception of the last one, each of said movers being adapted to enter a subsequent receiver for engaging coins located therein and shifting it through an angular extent inclusive of an angle proportional with the number of coins therein, means driven by the said last receiver through an angle formed by the sum of said angles and representative of the tendered amount provided by the coins inserted in all said receivers, setting-in means for setting-in amounts of the prices of the articles to be vended, price amount oscillatable means adapted to oscillate through angles proportional with said price amounts, means under the control of said setting-in means to oscillate said price amount oscillatable means through an angle proportional with the price amount set in at each operation, means for coupling said tendered amount last receiver driven means and price amount oscillatable means, said coupling means being operative during the displacement of one of said driven and oscillatable means, means for delivering an article, control means for said article delivering means, means for selectively cashing-in and refunding coins located in said receivers, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means and oscillatable means in the joint operation thereof.

7. An automatic apparatus for vending articles such as tickets and other objects having different prices, comprising a movable receiver able to receive a number of coins of a denomination pertaining to one ordinal, a mover adapted to enter said receiver for engaging coins located therein and shifting said receiver through an extent in proportion with such coins therein, a second receiver able to receive a number of coins of a denomination pertaining to another ordinal, a second mover adapted to enter said second receiver for engaging coins located therein and shifting said second receiver through an extent in proportion with such coins therein, means driven by said first-named receiver through an extent proportional with the amount formed by such coins therein under a given proportionality ratio, means driven by said second receiver through an extent proportional with the amount provided by such coins therein under the same proportionality ratio as in respect of said first receiver driven means, a transfer gear intermediate said first receiver driven means and second receiver driven means, said driven means including movable members each moved through a space including an extent proportional with the digit the tendered amount formed by coins introduced in said first and second receivers includes in the respective ordinal, means for actuating said movers each through an invariable stroke at each operation of said apparatus, setting-in means for setting-in amounts of the prices of the articles to be vended, price amount movable parts each adapted to move through extents in proportion with the digits the price amounts include in the several ordinals, means under the control of said setting-in means to drive said price amount movable parts each through an extent proportional with the digit the price amount set in at each operation has in the respective ordinal, means for intercoupling said tendered amount receiver driven movable member and said price amount movable part of each separate ordinal in a pair, said intercoupling means being operative during the displacement of one of said intercoupled movable member and part of each pair, means for delivering an article, control means for said article delivering means, means for selectively cashing-in and refunding coins located in said receivers, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said pairs of intercoupled movable members and parts in the joint operation thereof.

8. An automatic apparatus for vending articles such as tickets and other objects having different prices, comprising a movable receiver able to receive a number of coins of a denomination pertaining to one ordinal, a mover adapted to enter said receiver for engaging coins located therein and shifting said receiver through an extent in proportion with such coins therein, a second receiver able to receive a number of coins of another denomination pertaining to the same ordinal as said first receiver, a second mover adapted to enter said second receiver for engaging coins located therein and shifting said second receiver through an extent proportional with such coins therein, means for actuating said movers in succession each through an invariable stroke at each operation of said apparatus, means additively driven by said first and second receivers and adapted to accumulate amounts pertaining to said ordinal, means adapted to accumulate amounts pertaining to a higher ordinal, a transfer gear operative intermediate said accumulating means, said accumulating means including movable members each moved through a space including an extent proportional with the digit the tendered amount provided by coins introduced in said receivers includes in the respective ordinals, setting-in means for setting-in amounts of the prices of the articles to be vended, price amount movable parts each adapted to move through extents in proportion with the digits the price amounts include in the several ordinals means under the control of said setting-in means to drive said price amount movable parts each through an extent proportional with the digit the price amount set in at each operation has in the respective ordinal, means for intercoupling said tendered amount receiver driven movable member and said price amount movable part of each separate ordinal in a pair, said intercoupling means being operative during the displacement of one of said intercoupled movable member and part of each pair, means for delivering an article, control means for said article delivering means, means for selectively cashing-in and refunding coins located in said receivers, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said pairs of intercoupled movable members and parts in the joint operation thereof.

9. An automatic apparatus for vending articles such as tickets and other objects having different prices, comprising movable collecting means each able to receive a number of coins of a given denomination, mover means adapted to enter said collecting means for engaging coins located therein and shifting said collecting means through extents dependent upon coins therein, a number of said mover means being arranged each on one of said movable collecting means for cooperation with another of said collecting means and the last-named mover means and collecting means providing for an intermediate lost motion gap at their inoperative positions, means operating said mover means, movable means driven by said collecting means through an extent proportional with the tendered amount provided by coins located therein, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount collecting means driven movable means and said price amount movable means, said coupling means being operative during the displacement of one of said movable means. means for delivering an article, control means for said article delivering means, means for selectively cashing-in and refunding coins located in said collecting means, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

10. An automatic apparatus for vending articles such as tickets and other objects having different prices, comprising movable collecting means each able to receive a number of coins of a given denomination, mover means each adapted to enter one of said collecting means for engaging coins located therein and shifting the cooperating collecting means through extents dependent upon coins therein, each cooperating collecting means and mover means providing for an intermediate gap at their inoperative positions, coin leading means each opening in one of said gaps, means operating said mover means, movable means driven by said collecting means through an extent proportional with a tendered amount formed by coins located therein, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount collecting means driven movable means and said price amount movable means, said coupling means being operative during the displacement of one of said movable means, means for delivering an article, control means for said article delivering means, means for selectively cashing-in and refunding coins located in said collecting means, control means for said coin cashing-in and refunding means, and discriminating means operative on said article delivering means control means and coin cashing-in and refunding means control means to make either said article delivering means and said coin cashing-in means operative or said said coin refunding means operative according to whether or not said tendered amount covers said set-in price amount, said discriminating means being actuated by said coupled movable means in the joint operation thereof.

11. An automatic apparatus for vending articles such as tickets and other objects having different prices, comprising a number of movable receivers each adapted to receive a number of coins of a given denomination, a prime mover adapted to enter a first one of said receivers for engaging coins located therein and shifting said receiver through an extent inclusive of a portion in proportion with the number of coins therein, a mover on each of said receivers with the exception of the last one, said mover being adapted to enter a subsequent receiver for engaging coins located therein and shifting it through an extent inclusive of a portion proportional with the number of coins therein, said prime mover and each of said movers providing for an intermediate lost motion gap with respect to cooperating receivers in their inoperative positions, means for actuating said prime mover through an invariable space at each operation of said apparatus, said space being the sum of spaces devoted to coins in each of said receivers and said gaps, movable means driven by said last receiver through an extent being the sum of said portions and representative of the tendered amount provided by the coins inserted in all said receivers, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount receiver driven movable means and said price amount movable means, said coupling means being operative during the displacement of one of said movable means, means for delivering an article, control means for said article delivering means, means for selectively cashing-in and refunding coins located in said receivers, control means for said coin cashing-in and refunding means, and discriminating means operative on said article delivering means control means and coin cashing-in and refunding means control means to make either said delivering means and said coin cashing-in means operative or said coin refunding means operative according to whether or not said tendered amount covers said set-in price amount, said discriminating means being actuated by said said coupled movable means in the joint operation thereof.

12. An automatic apparatus for vending articles such as tickets and other objects having different prices, comprising a movable receiver able to receive a number of coins of a given denomination, a mover adapted to enter said receiver for engaging coins located therein and shifting said receiver through an extent dependent upon coins therein, means for operating said mover, movable means driven by said receiver through an extent proportional with the tendered amount provided by coins inserted in said receiver, return means on said mover for restoring said movable receiver and means driven thereby in inoperative position, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, timed means temporarily coupling said tendered amount receiver driven movable means and said price amount movable means, said coupling means being operative during the displacement of one of said movable means, means for delivering an article, control means for said article delivering means, means for selectively cashing-in and refunding coins located in said receiver, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

13. An automatic apparatus for vending articles such as tickets and other objects having different prices, comprising movable collecting means each able to receive a number of coins of a given denomination, mover means adapted to enter said collecting means for engaging coins located therein and shifting said collecting means through extents dependent upon coins therein, a number of said mover means being arranged each on one of said movable collecting means for cooperation with another of said collecting means, a prime mover for actuating said mover means and collecting means, movable means driven by said collecting means through an extent proportional with a tendered amount formed by the coins located therein, return means on said prime mover for restoring said collecting means and means driven thereby in inoperative position, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, timed means temporarily coupling said tendered amount collecting means driven movable means and said price amount movable means, said coupling means being operative during the displacement of one of said movable means, means for delivering an article, control means for said article delivering means means for selectively cashing-in and refunding coins located in said collecting means, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

14. An automatic apparatus for vending articles such as tickets and other objects having different prices, comprising movable collecting means each able to receive a number of coins of a given denomination, mover means adapted to enter said collecting means for engaging coins located therein and shifting said collecting means through extents dependent upon coins therein, means operating said mover means, movable means adapted to receive a drive from said collecting means through an extent proportional with a tendered amount formed by coins located therein, releasable drive transmitting means intermediate said collecting means and said movable means to be driven thereby, aligning means for said driven movable means, setting-in means fo setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount collecting means driven movable means and said price amount movable means, said coupling means being operative during the displacement of one of said movable means, means for delivering an article, control means for said article delivering means, means for selectively cashing-in and refunding coins located in said collecting means, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

15. An automatic apparatus for vending articles such as tickets and other objects having different prices, comprising movable collecting means each able to receive a number of coins of a given denomination, mover means adapted to enter said collecting means for engaging coins located therein and shifting said collecting means through extents dependent upon coins therein, means operating said mover means, movable means adapted to receive a drive from said collecting means through an extent proportional with a tendered amount formed by coins located therein, releasable drive transmitting means intermediate said collecting means and said movable means to be driven thereby, releasable transfer means operative intermediate said driven movable means, timed means for engagement, operation and release of said drive transmitting means and transfer means, means actuating said timed means, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount collecting means driven movable means and said price amount movable means, said coupling means being operative during the displacement of one of said movable means, means for delivering an article, control means for said article delivering means, means for selectively cashing-in and refunding coins located in said collecting means, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

16. An automatic apparatus for vending articles such as tickets and other objects having different prices, comprising movable collecting means each able to receive a number of coins of a given denomination, mover means adapted to enter said collecting means for engaging coins located therein and shifting said collecting means through extents dependent upon coins therein, means operating said mover means, said mover means enabling said coins to move out from said collecting means after said collecting means have been moved through said extents, movable means driven by said collecting means through an extent proportional with a tendered amount formed by coins located therein, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount collecting means driven movable means and said price amount movable means, said coupling means being operative during the displacement of one of said movable means, means for delivering an article, control means for said article delivering means, means for selectively cashing-in and refunding coins moving out from said collecting means, control means for said coin cashing-in and refunding means, and discriminating means operative on said article delivering means control means and coin cashing-in and refunding means control means to make either said article delivering means and said coin cashing-in means or said coin refunding means operative according to whether or not said tendered amount covers said set-in price amount, said discriminating means being actuated by said coupled movable means in the joint operation thereof.

17. An automatic apparatus for vending articles such as tickets and other objects having different prices, comprising movable collecting means each able to receive a number of coins of a given denomination, mover means adapted to enter said collecting means for engaging coins located therein and shifting said collecting means through extents dependent upon coins therein, means operating said mover means, said mover means enabling said coins to discharge from said collecting means after said collecting means have been moved through said extents, a movable receptacle for coins discharged from said collecting means, a cup free for user's access and a duct leading thereto, a cash gathering receptacle having a passage leading thereto, means releasably holding said movable receptacle with its outlet in register with said duct, means for shifting said movable receptacle in a position with its outlet in register with said passage, movable means driven by said collecting means through an extent proportional with a tendered amount formed by coins located therein, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount collecting means driven movable means and said price amount movable means, said coupling means being operative during the displacement of one of said movable means, means for delivering an article, control means for said article delivering means and movable receptacle shifting means, and discriminating means operative on said control means to cause the operation of said article delivering means and the coin cashing-in operation of said movable receptacle shifting means when said tendered amount covers said set-in price amount, said discriminating means being actuated by said coupled movable means in the joint operation thereof.

18. An automatic apparatus for vending articles such as tickets and other objects having different prices, comprising movable collecting means each able to receive a number of coins of a given denomination, mover means adapted to enter said collecting means for engaging coins located therein and shifting said collecting means through extents dependent upon coins therein, said cooperating collecting means and mover means providing for an intermediate gap at their inoperative positions, coin leading means each opening in register with one of said gaps for discharge of coins in excess over the capacity of respective collecting means, means operating said mover means, said mover means enabling said coins to discharge from said collecting means after said collecting means have been moved through said extents, a movable receptacle for coins discharged from said gaps and collecting means, a cup free for user's access and a duct leading thereto, a cash gathering receptacle having a passage leading thereto, means releasably holding said movable receptacle with its outlet in register with said duct, means for shifting said movable receptacle in a position with its outlet in register with said passage, movable means driven by said collecting means through an extent proportional with a tendered amount formed by coins located therein, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount collecting means driven movable means and said price amount movable means, said coupling means being operative during the displacement of one of said movable means, means for delivering an article, control means for said article delivering means and movable receptacle shifting means, and discriminating means operative on said control means to cause the operation of said article delivering means and the coin cashing-in operation of said movable receptacle shifting means when said tendered amount covers said set-in price amount, said discriminating means being actuated by said coupled movable means in the point operation thereof.

19. An automatic apparatus for vending articles such as tickets and other objects having different prices, comprising a movable receiver able to receive a number of coins of a given denomination, a mover adapted to enter said receiver for engaging coins located therein and shifting said receiver through an extent dependent upon coins therein, means for releasably engaging said receiver in its position it has been shifted into by said mover, means for operating said mover, movable means driven by said receiver through an extent proportional with a tendered amount formed by coins in said receiver, return means on said mover for restoring said movable receiver and means driven thereby in inoperative position, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, timed means temporarily coupling said tendered amount receiver driven means movable means and said price amount movable means, said coupling means being operative during the displacement of one of said movable means, means for delivering an article, control means for said article delivering means, means for selectively cashing-in and refunding coins located in said receiver, control means for said coin cashing-in and refunding means, and discriminating means operative on said article delivering means control means and coin cashing-in and refunding means control means to make either said article delivering means and said coin cashing-in means operative or said coin refunding means operative according to whether or not said tendered amount covers said set-in price amount, said discriminating means being actuated by said coupled movable means in the joint operation thereof.

20. An automatic apparatus for vending tickets having different prices comprising movable collecting means each able to receive a number of coins of a given denomination, mover means adapted to enter said collecting means for engaging coins located therein and shifting said collecting means through extents dependent upon coins therein, means operating said mover means, movable means driven by said collecting means through an extent proportional with the tendered amount provided by coins located therein, setting-in means for setting-in amounts of the prices of the tickets to be vended, price amount movable means adapted to move through extents proportional with said price amounts, means under the control of said setting-in means to drive said price amount movable means through an extent proportional with the price amount set in at each operation, means for coupling said tendered amount receiving means driven movable means and said price amount movable means, said coupling means being operative during the displacement of one of said movable means, means operative to deliver said ticket, a movable ticket delivery guide, a receptacle having a passage leading thereto and opening adjacent the outlet of said guide, means for holding said guide in its ticket delivering position and shifting it into a position with its outlet in register with said passage, control means for said register with said passage, means for selectively cashing-in and refunding coins located in said collecting means, control means for said ticket delivery guide shifting means and said coin cashing-in and refunding means, and discriminating means operative on said control means to cause them to make either said ticket delivery guide shifting means and coin refunding means operative or said ticket delivery guide shifting means inoperative and said coin cashing-in means operative according to whether said tendered amount does not cover or covers said set-in price amount, said discriminating means being actuated by said coupled movable means in the joint operation thereof.

21. An automatic apparatus for vending articles such as tickets and other objects having different prices, comprising movable collecting means each able to receive a number of coins of a given denomination, mover means adapted to enter said collecting means for engaging coins located therein and shifting said collecting means through extents dependent upon coins therein, means operating said mover means, movable means driven by said collecting means through an extent proportional with the tendered amount provided by coins located therein, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount receiving means driven movable means and said price amount movable means, said coupling means being operative during the displacement of one of said movable means, change coin distributing means, means for actuating said change coin distributing means, means for delivering an article, control means for said change coin distributing means, means for selectively cashing-in and refunding coins located in said collecting means, control means for said change coin distributing means actuating means and article delivering means and coin cashing-in and refunding means, and discriminating means operative on said control means to cause them either to make said change coin distributing means actuating means and article delivering means and tendered amount coin cashing-in means operative when said tendered amount covers said set-in price amount or to make said change coin distributing means actuating means and article delivering means inoperative and said tendered amount coin refunding means operative when said tendered amount is short with respect to said set-in price amount, said discriminating means being actuated by said coupled movable means in the joint operation thereof.

22. An automatic apparatus for vending articles as tickets and other objects having different prices, comprising movable collecting means each able to receive a number of coins of a given denomination, mover means adapted to enter said collecting means for engaging coins located therein and shifting said collecting means through extents dependent upon coins therein, means for operating said mover means, movable members each adapted to move through extents in proportion with the digits the tendered amounts provided by coins located in said collecting means include in one of the several ordinals, means operated by said coin collecting means to drive said tendered amount movable members each through an extent proportional with the digit the amount tendered at each operation has in the respective ordinal, setting-in means for setting-in amounts being the prices of the articles to be obtained, price amount movable parts each adapted to move through extents in proportion with the digits the price amounts include in one of the several ordinals, means under the control of said setting-in means to drive said price amount movable parts each through an extent proportional with the digit the price amount set-in at each operation has in the respective ordinal, means for intercoupling said tendered amount movable member and said price amount movable part of each separate ordinal, said intercoupling means being operative during the displacement of one of said intercoupled movable member and part, change coin distributing means, means for actuating said change coin distributing means including members each devoted to one ordinal and controlled by said intercoupled member and part of the respective ordinal, a transfer gear intermediate the said change coin distributing means actuating member of each ordinal and the similar member of next higher ordinal, means for delivering an article, means for selectively cashing-in and refunding coins located in said collecting means, control means for said change coin distributing means actuating means and article delivering means and coin cashing-in and refunding means, and a discriminating member operative on said control means to cause them either to make said change coin distributing means actuating means and article delivering means and tendered amount coin cashing-in means operative when said tendered amount covers said set-in price amount or to make said change coin distributing means actuating means and article delivering means inoperative and said tendered amount coin refunding means operative when said tendered amount is short with respect to said set-in price amount, said discriminating member being actuated by said change coin distributing means actuating member of highest ordinal.

23. An automatic apparatus for vending articles as tickets and other objects having different prices, comprising movable collecting means each able to receive a number of coins of a given denomination, mover means adapted to enter said collecting means for engaging coins located therein and shifting said collecting means through extents dependent upon coins therein, means for operating said mover means, movable members each adapted to move through extents in proportion with the digits the tendered amounts provided by coins located in said collecting means include in one of the several ordinals, means operated by said coin collecting means to drive said tendered amount movable members each through an extent proportional with the digit the amount tendered at each operation has in the respective ordinal, setting-in means for setting-in amounts being the prices of the articles to be obtained, price amount movable parts each adapted to move through extents in proportion with the digits the price amounts include in one of the several ordinals, means under the control of said setting-in means to drive said price amount movable parts each through an extent proportional with the digit the price amount set-in at each operation has in the respective ordinal, means for intercoupling said tendered amount movable member and said price amount movable part of each separate ordinal in a number of ordinals, said intercoupling means being operative during the displacement of one of said intercoupled movable member and part, change coin distributing means, means for actuating said change coin distributing means including members each devoted to one ordinal and controlled by said intercoupled member and part of the respective ordinal of said number of ordinals and by said parts in other ordinals, a transfer gear intermediate the said change coin distributing means actuating member of each ordinal and the similar member of next higher ordinal, means for delivering an article, means for selectively cashing-in and refunding coins located in said collecting means, control means for said change coin distributing means actuating means and article delivering means and coin cashing-in and refunding means, and a discriminating member operative on said control means to cause them either to make said change coin distributing means actuating means and article delivering means and tendered amount coin cashing-in means operative when said tendered amount covers said set-in price amount or to make said change coin distributing means actuating means and article delivering means inoperative and said tendered amount coin refunding means operative when said tendered amount is short with respect to said set-in price amount, said discriminating member being actuated by said change coin distributing means actuating member of highest ordinal.

24. An automatic apparatus for vending articles such as tickets and other objects having different prices, comprising movable collecting means each able to receive a number of coins of a given denomination, movable means adapted to enter said collecting means for engaging coins located therein and shifting said collecting means through extents dependent upon coins therein, means operating said mover means, movable means driven by said collecting means through an extent proportional with the tendered amount provided by coins located therein, setting-in means for setting-in amounts of the prices of the articles to be vended, price amount movable means adapted to move through extents proportional with said price amounts, means under the control of said setting-in means to drive said price amount movable means through an extent proportional with the price amount set in at each operation, means for coupling said tendered amount collecting means, driven movable means and said price amount movable means, said coupling means being operative during the displacement of one of said movable means, means for gathering coins discharging from said collecting means and conveying them to an outlet, means for shifting said gathering means into a position to convey said coins into a cash receptacle, change coin distributing means, means for actuating said change coin distributing means, means for delivering an article; control means for said coin gathering means shifting means, change coin distributing means, actuating means and article delivering means, and discriminating means operative on said control means to cause them to make said coin gathering means shifting means, change coin distributing means actuating means and article delivering means operative when said amount is not less than said price amount, said discriminating means being actuated by said coupled movable means in the joint operation thereof.

25. An automatic apparatus for vending articles as tickets and other objects having different prices, comprising movable collecting means each able to receive a number of coins of a given denomination, mover means adapted to enter said collecting means for engaging coins located therein and shifting said collecting means through extents dependent upon coins therein, means operating said mover means, movable means driven by said collecting means through an extent proportional with the tendered amount provided by coins therein, setting-in means for setting-in amounts of the prices of the articles to be obtained, price amount movable means adapted to move through extents proportional with said price amounts, means under the control of said setting-in means to move said price amount movable means through an extent proportional with the price amount set-in at each operation, means for coupling said tendered amount collecting means driven movable means and said price amount movable means, said coupling means being operative during the displacement of one of said movable means, means for selectively cashing-in and refunding coins located in said receiver, means for the delivery of an article, means actuating said article delivery means, means disabling said article delivery means actuating means, control means for said coin cashing-in and refunding means and for said disabling means, and discriminating means operative on said control means to cause them to make said coin refunding means and said disabling means operative when said tendered amount does not cover said set-in price amount, said discriminating means being actuated by said coupled movable means in the joint operation thereof.

26. An automatic apparatus for vending articles as tickets and other objects having different prices, comprising movable collecting means each able to receive a number of coins of a given denomination, mover means adapted to enter said collecting means for engaging coins located therein and shifting said collecting means through extents dependent upon coins therein, means for operating said mover means, movable means driven by said collecting means through an extent proportional with the tendered amount provided by coins therein, setting-in means for setting-in amounts of the prices of the articles to be obtained, price amount movable means adapted to move through extents proportional with said price amounts, means under the control of said setting-in means to move said price amount movable means through an extent proportional with the price amount set-in at each operation, means for coupling said tendered amount collecting means driven movable means and said price amount movable means, said coupling means being operative during the displacement of one of said movable means, means for selectively cashing-in and refunding coins located in said receiver, a plurality of article containing magazines, an ejector cooperating with each of said magazines, separate means for actuating each of said ejectors, general means for operating the last-named actuating means, control means for said coin cashing-in and refunding means and for said general operating means, discriminating means operative on said control means to cause them to make said general actuating means and said coin cashing-in means operative or said general actuating means inoperative and said coin refunding means operative according as said tendered amount covers or does not cover said set-in price amount, said discriminating means being actuated by said coupled movable means in the joint operation thereof, and control means operated by said price setting-in means to control said separate ejector actuating means.

ATTILIO ERRERA.